(12) United States Patent
Burgmeier

(10) Patent No.: US 11,403,273 B1
(45) Date of Patent: Aug. 2, 2022

(54) OPTIMIZING HASH TABLE SEARCHING USING BITMASKS AND LINEAR PROBING

(71) Applicant: Amazon Technologies, Inc., Seattle, WA (US)

(72) Inventor: Hermann Franz Burgmeier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 16/904,022

(22) Filed: Jun. 17, 2020

(51) Int. Cl.
*G06F 16/00* (2019.01)
*G06F 16/22* (2019.01)

(52) U.S. Cl.
CPC ...... *G06F 16/2255* (2019.01); *G06F 16/2272* (2019.01)

(58) Field of Classification Search
None
See application file for complete search history.

(56) References Cited

U.S. PATENT DOCUMENTS

| | | | | |
|---|---|---|---|---|
| 7,903,819 B2* | 3/2011 | Gupta | | G06F 16/2272 711/170 |
| 9,223,720 B2* | 12/2015 | Chase | | G06F 16/9014 |
| 10,503,716 B2* | 12/2019 | Chase | | G06F 16/2255 |
| 10,997,140 B2* | 5/2021 | Kardonik | | G06F 16/24552 |
| 2009/0067631 A1* | 3/2009 | Gupta | | G06F 16/2272 380/277 |
| 2014/0032569 A1* | 1/2014 | Kim | | G06F 16/137 707/747 |
| 2014/0372388 A1* | 12/2014 | Attaluri | | G06F 16/2255 707/693 |
| 2015/0120754 A1* | 4/2015 | Chase | | G06F 16/2255 707/747 |
| 2015/0121035 A1* | 4/2015 | Steele, Jr. | | H04L 45/7453 711/216 |
| 2015/0169467 A1* | 6/2015 | Chase | | G06F 16/9014 711/216 |
| 2015/0261751 A1* | 9/2015 | Kim | | G06F 16/951 707/757 |
| 2016/0275078 A1* | 9/2016 | Attaluri | | G06F 16/2456 |
| 2017/0154042 A1* | 6/2017 | Meyer | | G06F 16/9014 |
| 2020/0073952 A1* | 3/2020 | Kardonik | | G06F 16/24552 |

OTHER PUBLICATIONS

Hybrid memory-efficient multimatch packet classification for NIDS, Lee et al., (Year: 2015).*

* cited by examiner

*Primary Examiner* — Jean M Corrielus
(74) *Attorney, Agent, or Firm* — Lee & Hayes, P.C.

(57) ABSTRACT

Within hash tables, bitmask(s) may be used to determine whether a given key is part of a collision chain or otherwise contained within the hash table. In some instances, using bitmask(s) may avoid linearly probing an entirety of the collision chain. For example, bitmask(s) may be used when searching low hit rate hash tables or hash tables where misses predominantly occur. Upon locating a collision chain within the hash table, or when probing the collision chain, the bitmask(s) may indicate whether subsequent keys within the collision chain correspond to the given key. The bitmask(s) may represent subsequent keys within the collision chain, and therefore, comparing the given key with the bitmask(s) may indicate similarities therebetween for use in determining whether to search a remainder of the collision chain.

20 Claims, 8 Drawing Sheets

OPTIMIZING HASH TABLE SEARCHING USING BITMASKS AND LINEAR PROBING

BACKGROUND

Hashing is a process of converting a given key(s) into a numeric value or hash value. In hashing, keys are converted into hash values using a hash function and the resulting hash values are stored (i.e., indexed) in a hash table. Within the hash table, the hash values are indexed to associated key value pairs. For example, to look up or locate a certain key value pair, the key is hashed and the resulting hash value is then searched within the hash table.

In some instances, more than one key may have the same hash value, and correspondingly, more than one key may be indexed at a same location or slot within the hash table. This results in a collision. In some instances, chaining may be used to resolve collisions. Chaining represents a linked list of keys that have same hash value. These collision chains (i.e., linked lists) are then probed one by one to find a matching key (i.e., hit) or to determine that the key is not stored in the hash table (i.e., miss). However, probing the collision chain in this manner is often a slow and resource intensive process, particularly in instances where long collision chains need to be traversed.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
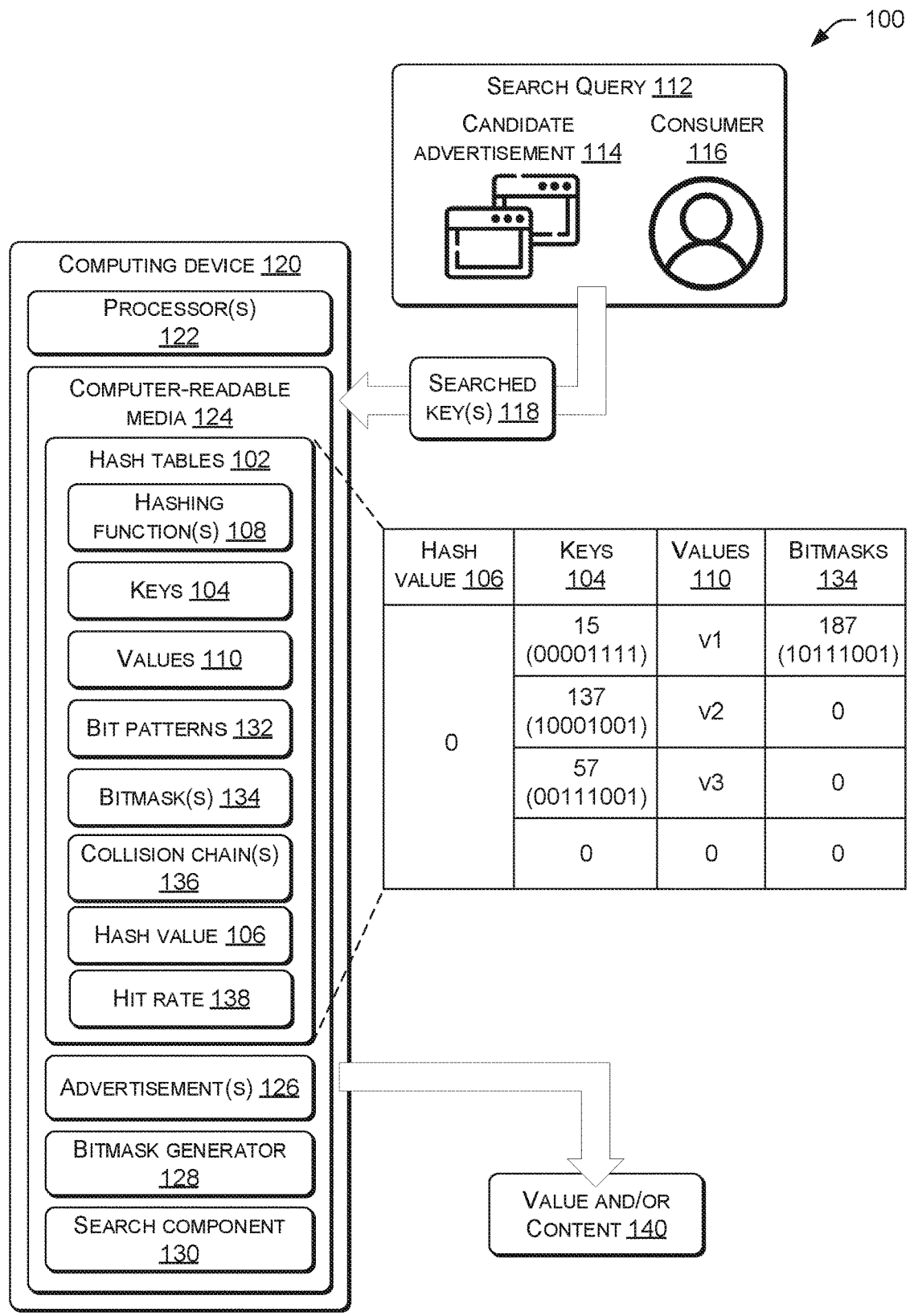
FIG. 1 illustrates an example environment for using bit patterns and/or bitmask(s) for determining whether a hash table contains a one or more searched key(s), according to an embodiment of the present disclosure. In some instances, a search query may be used for receiving information corresponding to a search or look up within the hash table. The search query may then be used determine whether the hash table contains key(s) associated with the search. In some instances, to search the hash table, the bit pattern of the searched key(s) may be compared against bit patterns of stored keys and/or a bit pattern of the bitmask(s), where the bit pattern of bitmask(s) represents a combination of the bit patterns of the stored keys. In some instances, one or more bitwise operators, such as a bitwise OR operator and/or a bitwise AND operator may be used for generating the bitmask(s) and searching the hash table for key(s).

Discussed above, collisions occur in instances where one or more keys are indexed to a common location or slot within a hash table. Once a collision is encountered, linear probing may be used to traverse the keys within the collision chain to determine whether the collision chain contains a given or searched key(s). However, in some instances, linear probing may require traversing long collision chains. This process is computationally intensive. Additionally, even in instances where the hash table does not contain the given or searched key, an entire length of the collision chain needs to be traversed to determine that the hash table does not contain the given or searched key (i.e., before a miss is returned). In these low hit rate scenarios, significant resources are spent probing for misses. Reducing lookup times in hash tables may reduce search times and/or require fewer computing resources.

Described herein are, among other things, systems and methods that may utilize bitmask(s) for use in determining whether a key is part of a collision chain or otherwise contained within a hash table. In some instances, using the bitmask(s) may avoid linearly probing an entirety of the collision chain, one by one, for determining whether or not the hash table contains key(s). For example, bitmask(s) may be used when searching low hit rate hash tables or hash tables where misses predominantly occur (i.e., the hash table historically does not contain the given or searched key). In some instances, the bitmask(s) may be stored at the beginning of the collision chain to allow for accelerated lookup times. For example, the bitmask(s) may be stored and/or associated with the first key of the collision chain. Upon determining that the hash value, or the slot, contains the collision chain the bitmask(s) may be identified. When subsequently probing or searching the collision chain, the bitmask(s) may be used to indicate whether subsequent keys within the collision chain correspond to the key. Therefore, in some instances, the bitmask(s) may be used to quickly determine the absence of the key within the hash table.

When generating hash tables, one or more hash function(s) may be used to transform keys. The hash function(s) represent a mapping between the keys and a slot (e.g., location) within the hash table where the key and an associated value are stored. The hash function(s) therefore receive keys as inputs and return a hash value (e.g., integer) for a range of slots within the hash table. As such, the keys are associated with the hash value having a particular slot within the hash table. Subsequently, when searching for the key within the hash table at a later instance, or to determine whether the hash table contains the key, the key is input into the hash function. The key is then hashed into the hash value and hash value is searched for within the hash table.

In some instances, the slot within the hash table corresponding to the hash value may be empty (e.g., with a zero (0) value or a special indicator value). This means that the key is not stored in the hash table. Herein, a look up to the hash table may determine a miss. In some instances, however, the key at the slot matches the key that is searched for and the look up determines that the key is stored in the hash table. This results in a hit and in such instances, the value associated with that key is returned.

Alternatively, if the slot within the hash table is associated with a different key other than the key that is searched for, a collision occurs. For example, multiple keys may include the same hash value as determined by the hash function. In these instances, multiple techniques may be employed to determine whether the hash table contains the key. In some instances, even though the slot for the hash value of the key is occupied by a different key, the key may be located in another slot of the hash table (e.g., open addressing) and these other slots within the hash table may be searched. In other instances, keys may be chained to the same hash value or to the same slot within the hash table. In this sense, if keys have the same hash value, these keys may be chained together in a linked list and hashed to the same slot within the hash table. In these instances, the collision occurs because the key searched for may not be the first key within the linked list. However, the key may be located elsewhere within the linked list (e.g., the second key within the collision chain, the third key in the collision chain, and so forth).

In some instances, linear probing may be used to search the collision chain to determine the existence of the key. In such instances, the probing may end with a hit (i.e., the key was found in the collision chain) or a miss (the key was not found in the collision). However, the entire length of the collision chain may need to be traversed in order to conclude that the collision chain contains the given key. This may occur even in instances where the key is not within the hash table. That is, whether the key is located within the collision chain is unknown until the entire collision chain is checked or a miss is returned.

Some collision chains are longer than others and require increased search times and/or demand increased computing resources. This is particularly true when searching low hit rate databases or in instances where the returned result is often a miss. Searching low hit rate databases therefore leads to significant probing for keys that are found to be non-existent in the hash table.

Utilizing bitmask(s) may serve to optimize and/or reduce an amount of time and/or resources spent probing for misses in low hit rate scenarios (either expected or measured). For example, bitmask(s) may be stored and/or associated with slots in hash tables that contain collision chains. In some instances, the bitmask(s) may be generated and stored in associated with the hash table during a generation of the hash table, and/or during an update to the hash table. The bitmask may contain a representation of keys that are stored in the slot, and/or which map to the same hash value within the hash table. In other words, the bitmask may characterize the keys within the collision chain.

In some instances, the bitmask may be generated using one or more bitwise operators in order to represent the keys within the collision chain. The bitwise operators may perform functions on binary bit patterns to generate the bitmask(s). Using the bit patterns of the keys, as well as the bitmask(s) allows for the key(s) that are being searched for to be compared against the keys in the collision chain. For example, the bitwise operators may operate on one or more bit patterns on an individual bit level for comparing the bit pattern of the searched keys with those contained in the collision chain.

In some instances, the bitwise operators may include a bitwise OR operator that combines the bit patterns of the keys stored at the slot (or those keys within the collision chain). The bitwise OR operator is a binary operation that takes two bit patterns of equal length and performs a logical inclusive OR operator on each pair of corresponding bits. With the bitwise OR operator, a resulting bit pattern of the bitmask is generated. In each position within bit pattern of the bitmask, a zero (0) is represented if both positions of the combined bit patterns are zero (0), and a one (1) is represented if either one or both of the positions of the combined bit patterns are one (1).

In some instances, the bitmask may be stored at or in association with the first key of the collision chain and/or the bitmask may be generated prior to searching the collision chain for the searched keys (e.g., during a generation of the hash table and/or during an update to the hash table). For example, when a key is searched for in the hash table, the first key stored at the hash value (i.e., slot, location, etc.) is first probed and compared to the key(s) being searched. If there is a match, meaning that the first key that is first probed corresponds to the key searched for, the searched key may be found and the value associated with the key (i.e., the first key) is returned. If there is not a match, and a collision occurs, the keys of the collision chain may be searched using the bitmask(s) and the searched key.

In some instances, as a result of determining that the first key of the collision chain is not the same as the key being searched for, another bitwise operator may be performed. For example, a bitwise AND operator may be performed on the bit pattern of the bitmask(s) and the bit pattern of the searched key. The bitwise AND operator compares each bit of the corresponding bit patterns and if both bits are one (1), the corresponding resulting bit is set to one (1). Otherwise, the corresponding bit is set to zero (0). Here, the bitwise AND operator compares the searched key with those keys in the collision chain (excluding the first key) to determine whether similarities exist. Therefore, performing the bitwise AND operator compares the searched key with the bitmask.

Once the bitwise AND operator is performed, if the result is the searched key (i.e., the result of the AND operator is a bit pattern that represents the bit pattern of the search key), this may indicate that the collision chain contains the given key. In some instances, rather than determining whether the bit patterns are the same, if similarities between the bit patterns exist, the searched key(s) may be determined to be located within the collision chain. However, even in these instances, the searched key being within the collision chain may not be guaranteed. This may result in a false-positive. For example, in some instances, the result of the bitwise AND operator may indicate that the collision chain contains the searched key. In this instance, the collision chain may be linearly probed using the bit pattern of the searched key for comparison with the bit patterns of the keys within the collision chain.

Alternatively, if the result of the bitwise AND operator is not the searched key(s) or if there are not similarities therebetween, then the searched key may be determined to not be part of the collision chain. That is, the bitmask and the searched key may not contain similarities and as a result, the key may be determined to be absent from the collision chain. Here, no additional probing of the collision chain may be required and a look up to the hash table may return a miss (i.e., the hash table does not contain the given key).

To illustrate the use of the bitmask(s), take for example that three keys all map to the same slot within a hash table. These three keys may be 15, 137, and 57. Here, a collision occurs because more than one key is assigned or located at the same slot within the hash table. Noted above, the first key, 15, may be associated with a bitmask that is determined using the remaining keys of the collision chain. The bitmask is calculated using the bitwise OR operator on the bit patterns of the remaining keys of the collision chain. For example, the bitmask of 137 OR 57 is 187. In other words, the bitwise OR operator is used on the binary bit pattern of 137 (i.e., 10001001) and 57 (i.e., 00111001). This results in a bitmask having a binary bit pattern for 187 (i.e., 10111001). When searching within the collision chain, the bit pattern of the searched key may be compared to the bit pattern of the first key (i.e., the bit pattern of 15). If there is not a match, then the bitwise AND operator may be performed on the bit pattern of the searched key and the bit pattern of the bitmask (i.e., 187 and he bit pattern of 187). This bitwise AND operator may indicate whether the bit pattern of the searched key contains similarities with the bit pattern of the bitmask, or whether the bit patterns are different. Such indication may be used to determine that the searched key is not within the hash table (the bit patterns are different) or to linearly probe the collision chain (the bit patterns are the same or contain similarities).

Additionally, assume that a key 65 (i.e., 01000001) is also hashed to the same slot and included within the collision chain. That is, the key 65 has the same hash value as 15, 137, and 57. Without the bitmask, the entire collision chain and/or in some instances, the hash table, would need to be traversed to determine whether the searched key (i.e., 65) is in the hash table. For example, the bit pattern of 65 would be compared to the bit patterns of 15, 137, and 57. This linear probing of the collision chain would end after 57 as no more keys are included within the collision chain. In such instances, the hash table would return a miss, meaning that the hash table does not contain the searched key. However, using the bitmask, the hash table may determine that the collision chain does not include the searched key.

For example, the bitwise AND operator may be performed on 65 AND 187 to determine that the bitwise AND operator of 65 AND 187 is equal to one (1). In other words, the bitwise AND operator of 65 (i.e., 01000001) and 187 (i.e., 10111001) results in a bit pattern of (00000001). The resulting bit pattern is equal to one (1), which is not equal to 65. That is, the resulting bit pattern of the bitwise AND operator does not represent the bit pattern of the searched key. This difference may indicate that the searched key (65) is not in the collision chain. A miss result may then be returned without traversing the entire collision chain, or the remaining keys within the collision chain (i.e., 137 and 57).

However, in some instances, the result of the bitwise AND operator may result in false positives. These false positives, in some instances, may be deemed acceptable under certain circumstances. For example, assume that the key 49 (i.e., 00110001) is hashed to the same slot as 15. Here, the bit pattern of 49 is compared to the bit pattern of 15, as well as the bitwise AND operator of 49 AND 187. For example, the bit pattern of 49 does not equal the bit pattern of 15. Additionally, the bit pattern of 49 AND 187 equals 49 (i.e., 00110001). That is, the bitwise AND operator of 49 (00110001) AND 187 (10111001) equals 49 (00110001). Because the result of the bitwise AND operator is the bit pattern of the searched key, the collision chain may be traversed to determine whether the collision chain does in fact contain the searched key. In other words, the bitwise AND operator may determine that the collision chain contains the searched key, even though the collision chain does not in fact contain the searched key. In these instances, a false positive may be determined and the collision chain may be linearly probed to determine whether in fact the hash table contains the searched key.

In some instances, the bitmask may only be probed once at the outset when a collision chain is encountered. For example, noted above, the bitmask may be used once, after the searched key is compared to the first key of the collision chain, and not anymore when traversing the collision chain. However, in some instances, bitmasks may be generated for additional keys within the collision chain. In turn, the bitmasks may be used in additional steps when searching the collision chain. As traversing of the collision chain continues, deeper into the collision chains the number of keys that contribute to the bitmask decreases. That is, less keys are used to generate the bitmask with the bitwise OR operator. As a result, using the bitmasks for comparison with the searched key may become more accurate and traversing the collision chain in instances where false positives are determined at the beginning of the collision chain may be lessened.

Storing the additional bitmasks, however, requires additional memory. In some instances, the increase in memory to store the additional bitmasks may outweigh traversing long collision chains and/or producing false positives.

Additionally, in some instances, the bitmask may be the same size as the key itself (e.g., eight bits). However, in some instances, a reduced subset of bits can be stored instead of the full bitmask. Additionally, while the above example describes the bit patterns having eight bits (i.e., one byte), longer bytes may be used (e.g., eight bytes (64 bits), 4 bytes (32 bits), etc.). The above example is merely illustrative for comparing bit patterns to determine similarities and/or differences between the bit patterns using bitwise operators. However, it is to be understood that the keys and/or the bitmasks may be associated with longer and/or shorter bit patterns. Additionally, or alternatively, one or more bloom filter(s) may be used for determining whether the hash table contains the searched key. In such instances, the bloom filter may include all the keys that collide with the searched key at a given location within the hash table.

As discussed above, in some instances, the techniques disclosed herein may extend to hash tables with low hit rates, or instances where a miss (zero (0)) is returned when searching the hash table. For these low hit rate hash tables, or where a low hit rate is expected, the bitmask(s) may be generated during a building of the hash table. Therein, when searching the hash table, the bitmask(s) may be utilized. As the hash table is updated (e.g., adding, updating, or deleting of entries), the bitmasks(s) may be correspondingly updated and stored in association with slots of the hash table. However, as the hit rate of the hash table increases, using the bitmask(s) may cause latencies. That is, performing the bitwise AND operator may increase an amount of time when probing for the searched key. In some instances, utilizing the bitmask(s) may be optimized such that if the hit rates of certain hash tables are lower than a certain threshold, the bitmask(s) are used when looking up keys within the hash tables. Conversely, if the hit rates are greater than the certain threshold, bitmask(s) may not be used. For example, in some instances, for hit rates greater than fifty percent, bitmask(s) may not be used. Therefore, in some instances, a hit rate of the hash table may be determined (or measured), compared against a threshold, and if the hit rate is less than or equal to the threshold, the bitmask(s) may be used. However, the threshold may be set to other hit rate values for optimizing the use of bitmask(s). Additionally, a hit rate associated with searching a particular slot or collision chain in the hash table may be used when determining whether to use the bitmask(s).

In some instances, the techniques discussed herein may extend to advertising and/or other consumer-based models. For example, databases may store advertisements in association with an amount of "clicks" the advertisement have historically received. In some instances, many of these advertisements (or data associated therewith) stored in the hash table may historically not have seen any clicks and/or may be associated with a small number of clicks. In these databases, whether a particular consumer "clicked" on an advertisement may be considered a low hit rate. That is, many of the advertisements may not have seen a click in the past, or a particular consumer may not have clicked on the advertisement. For example, the hash table may store consumers (key) in association with a number of times the consumer clicked on a particular advertisement (value). This "request" may be input as a search query, and the hash table may be searched to determine if, and/or how many times, the consumer clicked on the particular advertisement. In other words, a look up to the hash table may be performed to determine whether the consumer clicked or opened the particular advertisement. Under conventional techniques, traversing the hash table to determine whether the consumer clicked on the advertisement may involve significant amounts of time and/or computing resources. However, utilizing the bitmask(s), the hash tables may be quickly searched to determine whether the particular consumer clicked on an advertisement. The result (i.e., hit or miss) may be used to present additional advertisements to the consumer and/or other purposes (e.g., delivering the advertisement again to the consumer). However, although mentioned with regard to advertising, the techniques discussed herein may find use in other fields and/or applications where hash tables are utilized as an indexing structure for searching for data represented as key-value pairs (e.g., addresses, catalogs, libraries, etc.).

Therefore, in light of the above, using bitmask(s) may reduce the number of traversals of collision chains. By reducing the traversal of collision chains, less computing resources may be utilized and less time may be involved to determine whether a hash table contains searched keys.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 for searching hash tables 102 to locate key value pairs or to determine whether the hash tables 102 contain key value pairs. Generally, the hash tables 102 represents a collection of items, elements, or keys 104 which are stored in such a way (e.g., an array) to make the keys 104 easy to find in future instances. Each position of the hash table 102, often called a slot, may be associated with one or more keys 104, and may be named using an integer value.

The integer values are often called indexes or hash values 106, where the hash values 106 are calculated from the keys 104 and using hashing function(s) 108. The mapping between the keys 104 and the slot where that key 104 belongs in the hash table 102 is determined by the hashing function(s) 108. When searching within the hash tables 102, for example, to determine whether the hash tables 102 contains a particular or given key 104, the hashing function(s) 108 compute the hash value 106 and the slot within the hash tables 102 corresponding to the hash value 106 is checked to determine whether the key 104 is present. If so, value(s) 110 are returned. If not, a miss is returned.

The hash tables 102 may therefore be used to store various information about keys 104 and an associated value 110. Examples of using hash tables 102 may include, but are not limited to, storing phone numbers and/or addresses, storing social security numbers, and so forth. As discussed in relation to FIG. 1, however, the hash tables 102 (or a hash table 102) may store information that identifies advertisements, an amount "clicks" associated with advertisements, and/or a relatedness of advertisements to particular consumers. Using this information, or by searching the hash tables 102, characteristics of the consumers may be determined for delivering certain advertisements.

For example, FIG. 1 illustrates that as part of determining whether to deliver a particular advertisement, a search query 112 may be submitted. In some instances, the search query 112 may identify a candidate advertisement 114 and a consumer 116. In some instances, the candidate advertisement 114 may represent an advertisement that may be potentially delivered to the consumer 116 or an advertisement that was previously delivered to the consumer 116. For example, in submitting the search query 112, a request may be submitted for determining whether the consumer 116 previously clicked or opened the candidate advertisement 114. In essence, the search query 112 represents a look up to the hash tables 102. For example, knowing whether the consumer 116 opened the candidate advertisement 114 may be used for determining whether to deliver the candidate advertisement 114 again, at a future instance, or delivering a similar or like advertisement. When submitted, the search query 112 is or may be associated with searched key(s) 118, or key(s) that are searched for within the hash tables 102.

As shown, the request or the search query 112 may be sent to or received by a computing device 120. The computing device 120 may be configured to receive a plurality of search queries 112 corresponding to searching the hash tables 102 to locate key value pairs or determining whether the hash table 102 store the searched key(s) 118. The computing device 120 may accordingly include components for receiving requests (e.g., user interfaces), searching the hash tables 102, and outputting results. In some instances, the computing device 120 may represent a database that is searchable using the search query 112.

For example, in some instances, the computing device 120 may include processor(s) 122 and/or computer-readable media 124. The processor(s) 122 may perform various operations described herein. As shown, the computer-readable media 124 may store or otherwise have access to various information, including instructions that, when executed, cause the processor(s) 122 to perform operations described herein. The processor(s) 122 also communicatively couple to components for receiving data and transmitting instruction(s), as well as causing data to be stored within the computer-readable media 124.

The computer-readable media 124 is shown storing, or having access to, the hash tables 102, advertisement(s) 126, a bitmask generator 128, and/or a search component 130. Discussed above, the hash tables 102 may store information, such as key value pairs. The hash tables 102 are shown being associated with various information or data, such as the hashing function(s) 108, the keys 104, the hash values 106, the values 110, bit patterns 132, bitmask(s) 134, collision chain(s) 136, and/or hit rates 138.

The hashing function(s) 108 is/are configured to hash the search query 112 or the searched key(s) 118 that are submitted. The hashing function(s) 108 generate the hash values 106 that are associated with key value pairs. For example, the hashing function(s) 108 may generate the hash value 106 for a particular search query 112 and/or the searched key(s) 118 contained with the search query 112. The hash value 106 represents a location within the hash table 102. The hash value 106 may therefore be used to determine whether the searched key(s) 118 corresponding to the search query 112 are located within the hash table 102.

Introduced above, the key value pairs within the hash table 102 represent a key 104 and a value 110 that is associated with the key 104. The key value pairs may be stored in association with one another within the hash table 102, but to locate the key value pair within the hash tables 102, the hash value 106 is used. However, in some instances, searching the hash tables 102 may reveal that the hash tables 102 does not contain the searched key(s) 118.

In some instances, more than one key 104 may include the same hash value 106 and accordingly, more than one key 104 may be located within a particular slot of the hash table 102. In these instances, a collision occurs (i.e., when two keys 104 hash to the same slot). When more than one key 104 is hashed to the same slot, the keys 104 may be chained together to form a collision chain 136. For example, some slots within the hash table 102 may include collision chain(s) 136. In some instances, the collision chains 136 may represent a linked list of keys 104 that are associated with the slot or the hash value 106. In some instances, the collision chain 136 may include any number of keys 104 (e.g., ten, hundreds, thousands, etc.). The collision chains 136 may be determined during a generation of the hash table 102. Chaining may therefore allow multiple keys 104 to exist at the same location in the hash table 102. However, as more and more keys 104 are hashed to the same location, the difficulty of searching for a given key within the collision chain 136 increases.

In some instances, in searching for the searched key(s) 118 within the collision chain 136, the collision chain 136 is probed from begging to end. This means that the searched key(s) 118 are compared against the keys 104 in the collision chain 136 to determine if there is a match (i.e., the searched key(s) 118 is stored at the hash value 106 corresponding to the collision chain 136). By moving through the collision chain 136 in a sequential manner, this linear probing may be used to determine whether the hash table 102 contains the searched key(s) 118. However, only after all spaces in the collision chain 136 are checked is it determined that the searched key(s) 118 are not located in the hash table 102. Of course, if the searched key(s) 118 match a key 104 in the collision chain 136, a result (e.g., hit) is returned and the value 110 associated with searched key(s) 118 (i.e., the key 104 to which the searched key(s) 118 matches) is returned.

Each of the keys 104 may be associated with a bit pattern 132 (or binary bit pattern). The bit pattern 132 represents a combination of ones (1s) and/or zeros (0s) associated with the key 104. The bit pattern 132 of the searched key(s) 118 may be compared against the bit patterns 132 of the keys 104 within the hash table 102 to determine whether the hash table 102 contains the searched key(s) 118.

For example, FIG. 1 illustrates a hash table 102 that includes three keys 104 located in the same slot and/or have the same hash value 106. The hash value 106, labeled zero (0), therefore has three keys 104, and each of the keys 104 has an associated value 110 that is stored in the hash tables 102 (e.g., v1, v2, and v3, respectively). These three keys 104 are shown as being 15, 137, and 57. While the keys 104 are shown as being numbers, the keys 104 may include any words, characters, symbols, combinations thereof, and so forth. The use of the three keys 104 shown in the hash table 102 is merely an example.

Each of the three keys 104 is shown including a corresponding bit pattern 132 that is eight bits long. For example, the bit pattern of 15 is (00001111), the bit pattern of 137 is (10001001), and the bit pattern of 57 is (00111001). However, in some instances, the bit patterns 132 may be 8 bytes long for storing keys 104 that are longer than the three keys 104 illustrated in FIG. 1. That is, as the keys 104 become longer and/or include more information (e.g., names, email addresses, etc.), the keys 104 may be represented by longer bit patterns 132. Therefore, the example shown in FIG. 1 is merely illustrative and regardless of the length of the keys 104, the keys 104 may have a corresponding bit patterns 132 that are stored in association with the key 104 in the hash tables 102, and which are used for determining whether the searched key(s) 118 is located within the hash tables 102. In some instances, the bit patterns 132 may be determined from the American Standard Code for Information Interchange (ASCII).

For example, returning briefly to the example of using the hash tables 102 to determine whether the consumer 116 clicked on the candidate advertisement 114, the searched key(s) 118 may be compared against the bit patterns 132 of keys 104 contained within the hash table 102, or the bit patterns 132 of the keys 104 within the collision chain 136 (if present), to determine whether the hash table 102 includes information relating to a number of times the consumer 116 has clicked or opened the candidate advertisement 114. However, linear probing collision chains 136 to determine whether the consumer 116 clicked or opened the candidate advertisement 114 may consume large amounts of computing resources and/or take extended periods of time. That is, the entire collision chain 136 may need to be searched to determine whether the collision chain 136 contains the searched key(s) 118 or whether the collision chain 136 does not include the searched key(s) 118. To increase search times and/or reduce an amount of expended computing resources, the bitmask(s) 134 may be used for determining whether the collision chain 136 contains the searched key(s) 118. In some instances, the bitmask(s) 134 may be generated during a generation of the hash table 102. As such, certain hash tables 102 may include the bitmask(s) 134 and may be configured to utilize bitmask(s) 134 (e.g., low hit rate hash tables 102) when searching, while others may not include the bitmask(s) 134 and consequently, may not be configured to utilize the bitmask(s) 134 when searches of the hash table 102 are performed. However, in some instances, the bitmask(s) 134 may be added to pre-existing or previously generated hash tables 102.

The bitmask(s) 134 may represent a combination of one or more keys 104 within the collision chain 136. In some instances, the bitmask(s) 134 may be generated using the bit patterns 132 associated with the one or more keys 104 of the collision chain 136. In some instances, the bitmask(s) 134 may be generated using a combination of the bit patterns 132 of the keys 104 within the collision chain 136 that come after the first key in the collision chain 136. To combine the bit patterns 132 of the keys 104, a bitwise OR operator may be used.

For example, returning to the hash table 102 shown in FIG. 1, a bitmask 134 is shown stored in association with the first key of the collision chain (i.e., the key 15). This bitmask 134 is shown being the numeral 187 and having a bit pattern 132 of (10111001). The bitmask 134 may be generated using the second key (i.e., 137) and the third key (i.e., 57) of the collision chain 136. However, in instances where the collision chain 136 includes more than three keys 104, such as four or five keys 104, the fourth key and/or the fifth key may be used to generate the bitmask 134. In some instances, the bitmask 134 may be generated using the bitwise OR operator and combining the bit pattern 132 of the second key (137) and the bit pattern 132 of the third key (57). The bitwise OR operator of the second key and the third key produces the bitmask 134 having the bit pattern of (10111001). As similarly discussed above, in instances where the keys 104 contain longer bit patterns 132, the bitmask 134 may have a corresponding size. However, in some instances, condensed or smaller bitmask may be stored in association with the collision chain 136 or the first key.

Generally, the bitmask 134 represents a shortened version of the keys 104 contained within the collision chain 136, after the first key. The bitmask 134 may be used for comparison with the bit pattern 132 of the searched key(s) 118 to determine whether the keys 104 in the collision chain 136, subsequent to the first key, correspond to the searched key(s) 118 being searched. For example, at a first instance, the bit pattern 132 of the searched key(s) 118 may be compared against the bit pattern 132 of the first key to determine whether the first key corresponds to the searched key(s) 118. If not, then the bitmask 134 stored in association with the first key may be used to determine whether the remaining keys 104 of the collision chain 136 correspond to the searched key(s) 118. Using the bitmask 134 in this manner may avoid linearly probing all of the keys 104 within the collision chain 136 to determine whether the collision chain 136 contains the searched key(s) 118

For example, the bit pattern 132 of the searched key(s) 118 may be combined with a bit pattern 132 of the bitmask 134 using a bitwise AND operator. The result of the bitwise AND operator may generate another bit pattern 132 used for comparison with the bit pattern 132 of the searched key(s) 118 to determine whether the searched key(s) 118 is in the collision chain 136. For example, comparing the bit pattern 132 of the bitmask 134 and the bit pattern 132 of the searched key(s) 118 may determine whether there are similarities between the bit patterns 132. If there are similarities, this may indicate that the collision chain 136 contains the searched key(s) 118 somewhere within the collision chain 136. As a result, the collision chain 136 may be linearly probed to locate the searched key(s) 118 and a corresponding value. For example, the collision chain 136 may be probed to compare the bit pattern 132 of the searched key(s) 118 to the bit patterns 132 of the keys 104 of the collision chain 136. If a match is found (i.e., the bit pattern 132 of the searched key(s) 118 matches a bit pattern 132 of one of the keys 104 within the collision chain 136), the value 110 associated with the key 104 may be returned.

In the example of the candidate advertisement 114, if the consumer 116 has previously clicked on the candidate advertisement 114, a value and/or content 140 may be returned. This value and/or content 140 may indicate how many times the consumer 116 clicked on the candidate advertisement 114 (e.g., twice). This result may be used to select another advertisement, among the advertisement(s) 126, or to use the candidate advertisement 114 to send to the consumer 116.

Alternatively, the comparison of the bit pattern 132 of the searched key(s) 118 and the bit pattern 132 of the bitmask 134 may indicate that the bit patterns 132 are not the same and/or do not contain any similarities. As the bit pattern 132 of the searched key(s) 118 is not the same as the bit pattern 132 of the bitmask 134 (which represents keys 104 within the collision chain 136), the searched key(s) 118 may be determined to not be located within the collision chain 136 (and therefore the hash table 102). That is, based at least in part on the collision chain 136 not including the searched key(s) 118, a result may be returned that indicates a miss, meaning that the searched key(s) 118 are not located within the hash table 102 and/or that the hash table 102 does not include the value 110 for the searched key(s) 118. In these instances, rather than linearly probing the collision chain 136 one by one, the bitmask 134 may be used for comparison to the searched key(s) 118, and if the bitmask 134 (i.e., the bit pattern 132 thereof) is not the same as the searched key(s) 118 (i.e., the bit pattern 132 thereof), this may determine that the hash table 102 does not contain the searched key(s) 118. For example, returning to the example of the candidate advertisement 114, comparing bit pattern 132 of the searched key(s) 118 with the bit pattern 132 of the bitmask 134 may indicate that the collision chain 136 does not contain the searched key(s) 118.

Using the hash table 102 shown in FIG. 1 as an example, assume that a fourth key (65; 01000001) is also hashed to the same slot in the hash table 102 (i.e., the hash value zero (0)). Without the bitmask 134, the collision chain 136 would have to be traversed to determine if the key (65) is in the hash table 102. This linear probing would end at the fourth entry, and a miss would be returned (i.e., the key 65 is not located within the hash table 102). However, using the bitmask 134, the hash table 102 may perform a bitwise AND operator on 65 AND 187. The bitwise AND operator of 65 (01000001) AND 187 (10111001) is 1 (00000001). Since 1 (00000001) does not equal 65 (01000001), it may be determined that the key (65) is not in the collision chain 136 and a miss may be returned. The bitmask 134 may reduce an amount of computing resources that are conventionally spent probing low hit rate hash tables 102, or those search queries 112 that frequently (above and/or below a certain threshold) return a miss.

In some instances, using the bitmasks 134 may return false positives and indicate that the hash table 102 contains certain keys 104, when in fact the hash table 102 does not contain the keys 104. For example, using the hash table 102 shown in FIG. 1 as an example, assume that the key 49 (00110001) is also hashed to the same slot as the three keys (i.e., the zero (0) slot). Here, performing the bitwise AND operator returns a result of 49 (00110001), even though the hash table 102 does not contain key 49. That is, the bitwise AND operator of 49 (00110001) AND 187 (10111001) is 49 (00110001). This indicates that the hash table 102 contains similarities with the bitmask 134, and therefore, indicates that the collision chain 136 includes the key (49), when in fact the collision chain 136 does not contain the key (65). In these false positive scenarios, the full length of the collision chain 136 may be traversed to determine whether the collision chain 136 in fact, contains the searched key(s) (i.e., the key 65). In this sense, the bitmask 134 may still be used to determine whether to linearly probe the remaining keys 104 of the collision chain 136.

In some instances, the first key within the hash table 102 may contain an indication of the collision chain 136. The indication may indicate that the hash value 106 or the slot contains a collision chain 136. This indication may be used to trigger use of the bitmask 134 when searching the collision chain 136. However, in some instances, if the first key within the hash table 102 does not match the searched key(s) 118, this result may be used to trigger use of the bitmask(s) 134. For example, as shown in FIG. 1, the bitmask (187) is shown being stored in association with the first key (15), and if the first key does not match the searched key(s) 134, the bitmask 134 stored in association with the first key may be used for searching the collision chain 136.

In some instances, more than one bitmask 134 may be used for searching the collision chain 136. For example, each key 104 within the collision chain 136, except for the last key, may be associated with a bitmask 134 that represents subsequent keys in the collision chain 136. These additional bitmasks 134 may not utilize the bit patterns 132 of the preceding keys 104 as those keys 104 have been previously searched. The additional bitmasks 134 may therefore be generated using different combination of keys 104 of the collision chain 136, where these different combination of keys 104 succeed a given key in the collision chain 136.

The bitmasks 134 stored in association with the keys 104 may be used for iteratively determining whether the collision chain 136 contains the searched key(s) 118. By searching deeper into the collision chain 136, the keys 104 that contribute to the generation of the bitmasks 134 decreases and therefore, the bitmasks 134 may become more accurate to predict whether the collision chain 136 includes the searched key(s) 118. By way of example, using the hash table 102 shown in FIG. 1, if the collision chain 136 contains a fourth key, a second bitmask 134 may be stored in association with the second key (137), where the second bitmask 134 is generated using a bitwise OR operation on the bit patterns 132 of the third key (57) and the fourth key. Herein, the searched key(s) 118 may be compared against the bit pattern of the second bitmask 134 using the bitwise AND operator. The bitmask(s) 134 stored in association with the key(s) 104 may be determined during a generation of the hash table 102, during an update to the hash table 102, or added to previously generated hash tables 102.

The hit rates 138 may be stored in association with the hash tables 102 and indicate a hit rate of the hash table 102, or hits within the hash tables 102. For example, the hit rate 138 may represent a ratio, percentage, or number of times that searching the hash tables 102 returns a miss. In these instances, searching the hash tables 102 (or the collision chain 136) to only return a miss represents a significant use of computing resources. Therefore, in some instances, the computing device 120 may selectively determine when to search the hash tables 102 using the bitmask 134 to optimize searches. In some instances, the hit rate 138 may represent a number of times that searching the hash table 102 results in a hit. In some instances, during a generation of the hash table 102, the hit rate 138 may represent an expected hit rate that represents an estimate or expected hit rate of searches performed within the hash table 102.

In some instances, the hit rate 138 of the hash table 102 may be compared against a threshold to determine whether the hit rate 138 is greater than the threshold hit rate (e.g., satisfies the threshold). Additionally, or alternatively, the hit rate 138 may be compared against the threshold to determine whether the hit rate 138 is less than the threshold. In some instances, the threshold hit rate may be thirty percent, fourth percent, fifty percent, seventy percent, etc. In some instances, the threshold hit rate may be dynamically determined based on using historical data that indicates an amount of time and/or resources utilized when searching the hash tables 102 using the bitmask 134 and without using the bitmask 134.

In some instances, when the hit rate 138 is greater than the threshold hit rate, searching the collision chain 136 using the bitmask(s) 134 may be more time consuming and/or resource intensive than linearly probing the collision chain 136 and comparing the bit pattern 132 of the searched key(s) 118 with the bit patterns 132 of the keys 104 contained within the collision chain 136. Conversely, if the hit rate 138 is less than the threshold hit rate, the bit pattern 132 associated with the bitmask 134 stored in association with the collision chain 136 and/or a first key of the collision chain 136 may be used for searching the collision chain 136, as discussed above.

The computing device 120 is further shown including a bitmask generator 128 and/or a search component 130. The bitmask generator 128 may generate and/or store the bitmasks 134 in association with the keys 104 of the hash tables 102. For example, the bitmask generator 128/may generate the bitmasks 134 using the bitwise OR operator. Meanwhile, the search component 130 may function to search the collision chains 136 and/or the hash tables 102 to locate the searched key(s) 118 and/or determine whether the collision chains 136 and/or the hash tables 102 contain the searched key(s) 118. The search component 130 may use the bitmasks 134 and/or the bit patterns 132 of the keys 104 when searching the hash tables 102.

As used herein, a processor, such as the processor(s) 122 may include multiple processors and/or a processor having multiple cores. Further, the processor(s) 122 may comprise one or more cores of different types. For example, the processor(s) 122 may include application processor units, graphic processing units, and so forth. In one implementation, the processor(s) 122 may comprise a microcontroller and/or a microprocessor. The processor(s) 122 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

As used herein, the computer-readable media 124 may be implemented as computer-readable storage media ("CRSM"), which may be any available physical media accessible by the processor(s) 122 to execute instructions stored on memory. The memory (or non-transitory computer-readable media) may include volatile and nonvolatile memory, removable and non-removable media implemented in any method or technology for storage of information, such as computer-readable instructions, data structures, program modules, or other data. Such memory includes, but is not limited to, random access memory ("RAM"), read-only memory ("ROM"), erasable programmable read-only memory ("EEPROM"), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device and the processor(s) 122.

FIGS. 2-5 illustrate various processes related to searching hash tables. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIG. 1, although the processes may be implemented in a wide variety of other environments, architectures, and systems.

Figure 2:
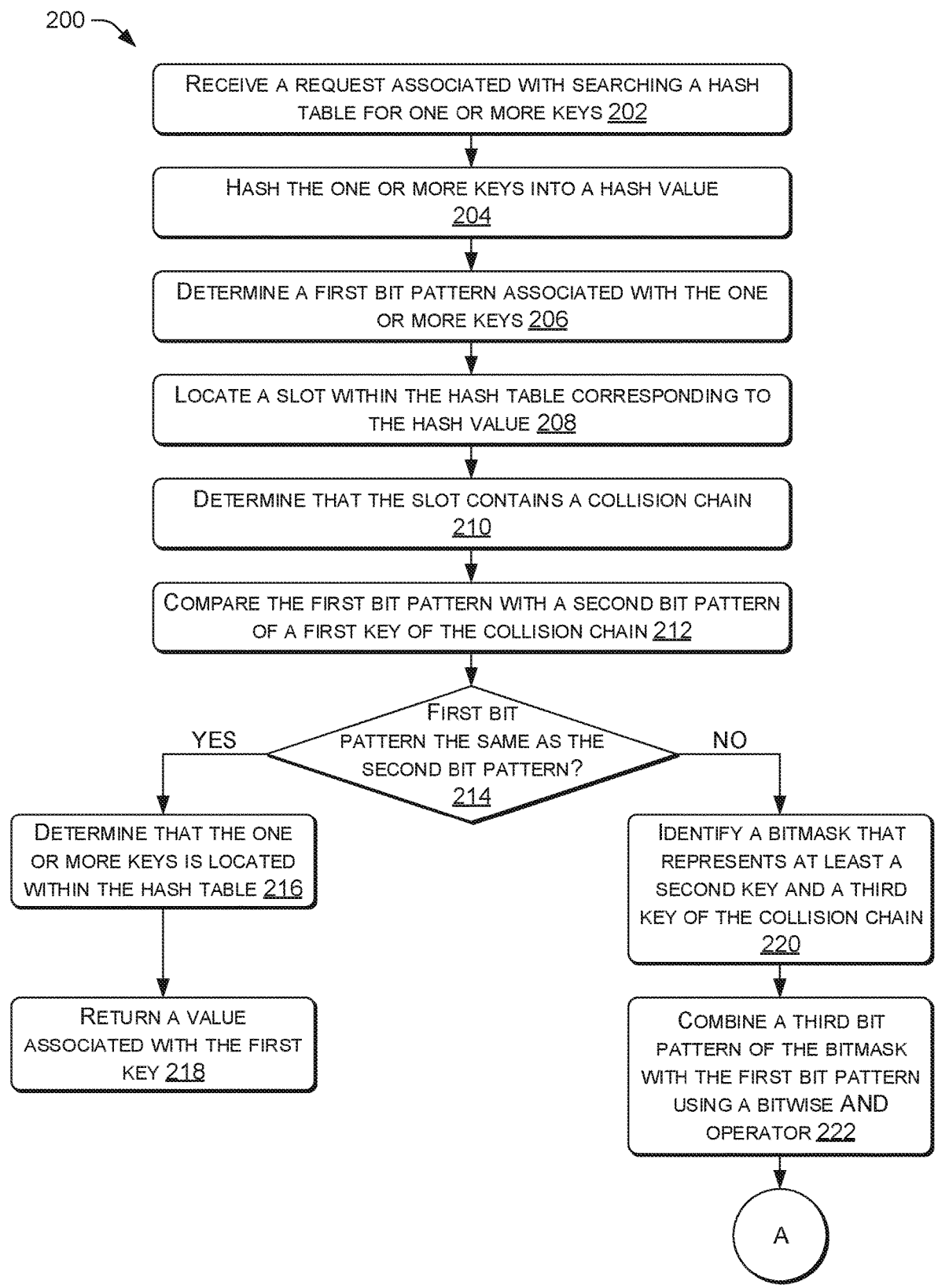
FIG. 2 illustrates an example process for searching a hash table using a bit pattern and/or a bitmask, according to an embodiment of the present disclosure.

FIG. 2 illustrates an example process 200 for using the bit patterns 132 and/or the bitmask(s) 134 for searching the hash tables 102. For example, the hash tables 102 may be searched to determine whether the hash tables 102 contains stored key value pairs.

At 202, the process 200 may receive a request associated with searching a hash table for one or more keys. For example, the computing device 120 (or components thereof) may receive a request for searching the hash table 102 to determine whether the hash tables 102 contains certain information. The search may be for essentially any type of search within the hash table 102 for determining whether the hash table 102 contains or stores certain information associated with one or more searched key(s) 118. By way of example, the request may be searching for a phone number of "John Smith Jr." As such, the request at 202 may be used to search the hash table 102 to determine whether the hash table 102 contains sought information (i.e., the phone number of John Smith Jr.). The search, however, may contain, or the computing device 120 may determine one or more searched key(s) 118 that are searched for within the hash table 102.

At 204, the process 200 may hash the one or more keys into a hash value. For example, the computing device 120 may use the hashing function(s) 108 stored in association with the hash tables 102. The hashing function(s) 108 may receive the one or more keys within the search query 112 and hash the one or more keys (or additional information within the search) into the hash value 106. The hashing function(s) 108 computes a position in the hash table 102 where the hash value 106 (i.e., the key) is located. For example, the hash values 106 are often stored, located, or indexed to slots within the hash tables 102. Accordingly, knowing the hash value 106 allows for the one or more keys within the search to be searched within the hash tables 102.

At 206, the process 200 may determine a first bit pattern associated with the one or more keys. For example, the computing device 120 may determine the bit pattern 132 of the one or more keys, where the bit pattern 132 represents the one or more keys in ones (1s) and zeros (0s). To determine the bit pattern 132, the computing device 120 may utilize an ASCII character table for converting the one or more keys into the bit pattern 132. As each key may be associated with a particular bit pattern 132, the bit pattern 132 allows for comparison to bit patterns 132 of keys 104 stored within the hash tables 102. In other words, in some instances, the bit pattern 132 of the search for one or more key(s) being searched (e.g., John Smith Jr) is compared against bit patterns 132 within the hash tables 102 to determine whether the hash tables 102 stores a phone number for John Smith Jr.

At 208, the process 200 may locate a slot within the hash table corresponding to the hash value. For example, after hashing the one or more keys into the hash value 106, the location (i.e., slot) of the hash value 106 within the hash table 102 may be determined. By way of example, the hash value 106 may be indexed to a fifth slot within the hash tables 102.

At 210, the process 200 may determine that the slot contains a collision chain. For example, the computing device 120 may determine that the slot contains multiple keys 104, or that multiple keys 104 map to the same slot within the hash table 102. That is, oftentimes, keys 104 may have the same hash value 106 and map to the same location within the hash table 102. This creates a collision and the slot contains the collision chain 136. For example, the slot may contain keys 104 for "John Smith," "John Smith Jr.," "John Smith Sr.," "John Smith III," and so forth. While each of these keys 104 have a distinct name, these keys 104 may map to the same slot within the hash table 102.

At 212, the process 200 may compare the first bit pattern with a second bit pattern of a second key of the collision chain. For example, the computing device 120, and/or components thereof, may compare the bit pattern of the one or more keys being search for (i.e., John Smith Jr.) to a bit pattern of a first key contained within the collision chain 136. The one or more keys being searched for may be compared to the first key, which may represent a first key within the collision chain 136 (i.e., an initial key within the collision chain 136). For example, the first key within the collision chain 136 may be "John Smith" and correspondingly, the bit pattern of the one or more keys may be compared against a bit pattern of the first key (John Smith) that represents the first key within the collision chain 136.

At 214, the process 200 may determine whether the first bit pattern is the same as the second bit pattern. For example, based at least in part on comparing the first bit pattern and the second bit pattern, the computing device 120 (or components thereof) may determine whether the first bit pattern is the same as the second bit pattern. In some instances, rather than determining whether the first bit pattern is the same as the second bit pattern, the process 200 may determine whether the first bit pattern and the second bit pattern contain similarities (e.g., similar one(s) and/or zero(s) in the bit patterns). If the first bit pattern is the same as the second bit pattern, the process 200 may follow the "YES" route and proceed to 216.

At 216, the process 200 may determine that the one or more keys is located within the hash table. For example, based on determining that the first bit pattern of the one or more key being searched for is/are the same as the second bit pattern of the first key in the collision chain 136, the computing device 120 may determine that the one or more keys is located within the hash tables 102. Determining that the one or more keys is located within the hash table may represent a "hit," meaning that the value associated with the one or more keys being searched are within the hash table. Therefore, as a result of determining at 214 that the first bit pattern and the second bit pattern are the same may mean that the first key (or keys) within the collision chain 136 represents the one or more keys being searched for.

At 218, the process 200 may return a value associated with the first key. For example, based at least in part on determining that the one or more keys is located within the hash table 102, and that the one or more keys is the same as the first key in the collision chain 136, the value 110 associated with this key may be returned. For example, assume that the first key in the collision chain is John Smith Jr., and at 218, the phone number of John Smith Jr. may be returned.

Alternatively, if at 214, the process 200 determines that the first bit pattern is not the same as the second bit pattern, the process 200 may follow the "NO" route and proceed to 220. The process 200 may proceed to 220 instances where the searched key(s) is not the same as the first key of the collision chain 136.

At 220, the process 200 may identify a bitmask that represents at least a second key and a third key within the collision chain. For example, as the collision chain 136 contains more than one key, the second key and the third key of the collision chain 136 may be used to determine the bitmask 134. In some instances, the bitmask 134 may be generated using a bit pattern of the second key and a bit pattern of the third key. For example, the bit pattern of the second key and the bit pattern of the third key may be used to generate the bitmask 134 using a bitwise OR operator. The bitmask 134 may also be stored in association with the first key of the collision chain 136, and utilized when the bit pattern of the one or more keys is not the same as the first bit pattern of the first key.

At 222, the process 200 may combine a third bit pattern of the bitmask with the first bit pattern using a bitwise AND operator. For example, after determining the bitmask 134, the computing device 120 (or components thereof) may combine the third bit pattern of the bitmask 134 with the bit pattern of the one or more keys using the bitwise AND operator. In other words, the bit pattern of the one or more keys may be combined with the bit pattern of the bitmask 134, which in turn, may be used to determine whether the hash table 102 contains the one or more keys.

Figure 3:
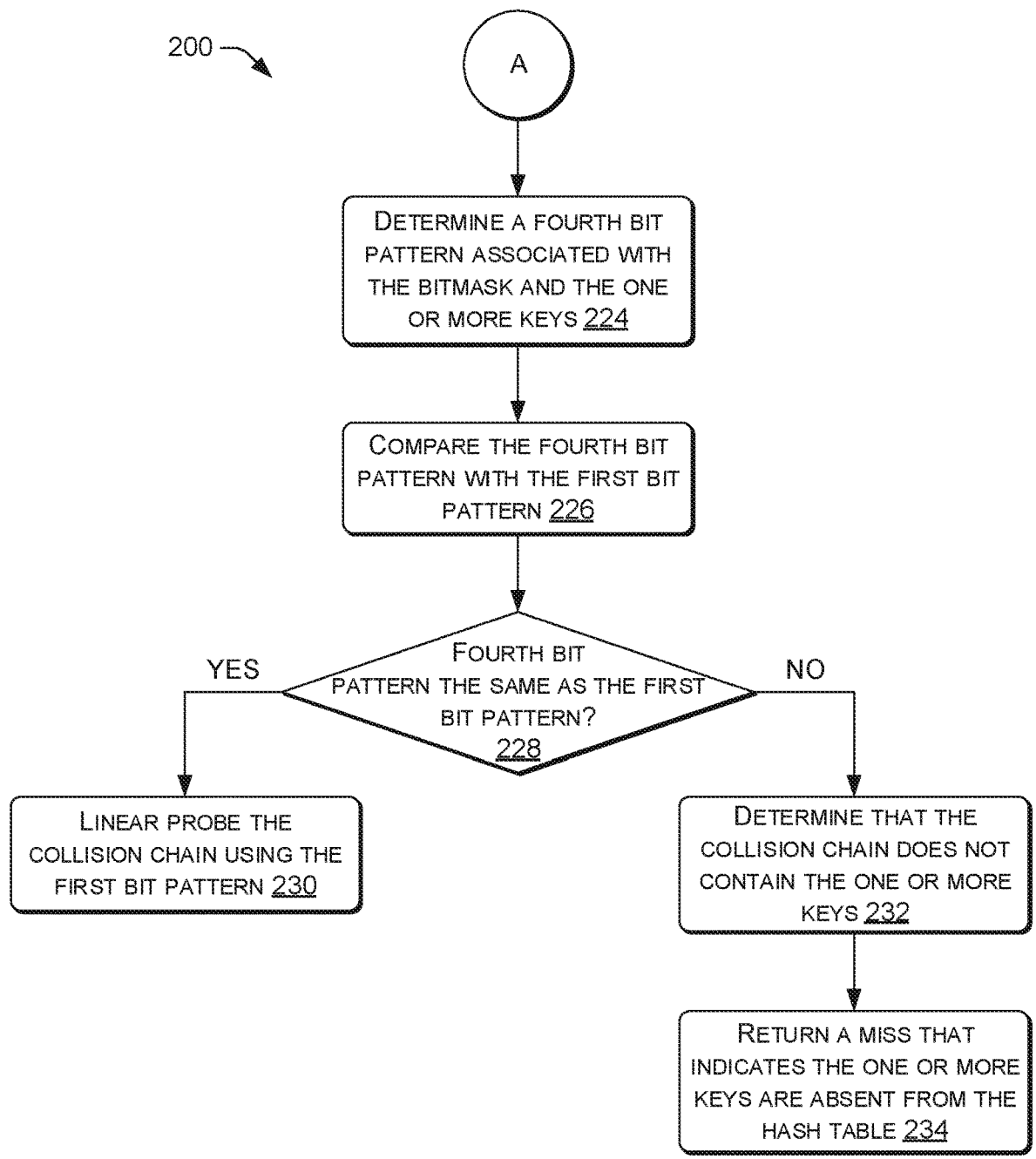
FIG. 3 illustrates additional operations of the example process of FIG. 2, according to an embodiment of the present disclosure.

From 222, the process 200 may proceed to "A," which is discussed in more detail in FIG. 3. For example, as shown in FIG. 3, from "A," the process 200 may proceed to 224.

At 224, the process 200 may determine a fourth bit pattern associated with the bitmask and the bit pattern of the one or more keys. For example, as a result of combining the third bit pattern of the bitmask 134 and the first bit pattern of the one or more keys using the bitwise AND operator, the fourth bit pattern may be generated. The fourth bit pattern may be used for searching the hash tables 102 for the one or more keys.

At 226, the process 200 may compare the fourth bit pattern with the first bit pattern. For example, after combining the bit pattern 132 of the bitmask 134 and the bit pattern 132 of the one or more keys, the generated fourth bit pattern may be compared against the bit pattern of the one or more keys.

At 228, the process 200 may determine whether the fourth bit pattern is the same as the first bit pattern. As a result of comparing the fourth bit pattern and the first bit pattern, the process 200 may determine whether the bit patterns are the same. For example, the bit locations within the bit patterns may be compared. In some instances, determining whether the fourth bit pattern is the same as the first bit pattern may include determining whether there are similarities between the first bit pattern and the fourth bit pattern (e.g., a threshold similarity). For example, if certain bit locations have the same value (e.g., one (1) or zero (0)), then the bit patterns may be considered to have similarities. These similarities may indicate that the collision chain 136 includes or does not include the one or more keys being searched. As such, if at 228, the process 200 determines that the bit patterns are the same (or have similarities), this may indicate that the collision chain 136 may contain the one or more keys somewhere within a length of the collision chain 136. As a result, the process 200 may follow the "YES" route and proceed to 230.

At 230, the process 200 may linearly probe the collision chain using the first bit pattern of the one or more keys. For example, the computing device 120 may linearly probe the collision chain 136 to compare the bit pattern of the one or more keys to the bit patterns of the keys 104 contained within the collision chain 136. In some instances, the collision chain 136 may include any number of keys 104, and accordingly, the process 200 may linearly probe the keys until a match is found (i.e., the bit pattern of the one or more keys match a bit pattern of one of the keys within the collision chain 136). Upon finding a match, the process 200 may return the value 110 of the searched key(s) 118. In some instances, a matching key may not be found and a miss may be returned (e.g., false positive).

In some instances, in addition to or alternative to linearly searching the hash tables 102, additional bitmasks may be used for searching within the hash table 102. For example, each key 104 within the collision chain 136, except for the last key, may be associated with a bitmask 134 that represents subsequent keys in the collision chain 136. These additional bitmasks 134 may not utilize the bit patterns 132 of the preceding keys 104 as those keys 104 have been previously searched. The additional bitmasks 134 may therefore be generated using different combination of keys 104 of the collision chain 136. The bitmasks 134 stored in association with the keys 104 may be used for iteratively determining whether the collision chain 136 contains the searched key(s) 118. By searching deeper into the collision chain 136, the keys 104 that contribute to the generation of the bitmasks 134 decreases and therefore, the bitmasks 134 may become more accurate to predict whether the collision chain 136 includes the searched key(s) 118.

Alternatively, if at 228, the process determines that the fourth bit pattern is not the same as the first bit pattern, this may indicate that the collision chain 136 does not contain the one or more keys. As a result, the process 200 may follow the "NO" route and proceed to 232.

At 232, the process 200 may determine that the collision chain does not contain the given key. For example, because the bit pattern of the one or more keys is not the same as the bit pattern of the bitmask (which represents keys within the collision chain 136), the process 200 may determine that the one or more keys is not contained within the collision chain 136. Noted above, determining that the one or more keys is not in the collision chain may involve determining that there are no similarities between the first bit pattern and the fourth bit pattern. As such if the bit patterns do not contain similarities, then the one or more may be determined to be absent from the collision chain 136.

At 234, the process 200 may return a miss that indicates the one or more keys is absent from the hash table 102. For example, based at least in part on the collision chain 136 not including the one or more keys, the process 200 may return a result that indicates a miss, indicating that the one or more keys is not located within the hash table 102, and/or that the hash table 102 does not include the value 110 for the one or more keys. That is, rather than linearly probing the collision chain 136 one by one, the bitmask 134 may be used for comparison to the one or more keys, and if the bitmask 134 (i.e., the bit pattern thereof) is not the same and/or similar to the one or more keys (i.e., the bit pattern thereof), the process 200 may determine that the hash table 102 does not contain the one or more keys.

Although the process 200 describes determining the bitmask 134 for the second key and the third key within the collision chain 136, the bitmask 134 may represent any number of keys within the collision chain 136. For example, if the collision chain 136 includes ten, twenty, hundreds, and/or thousands of keys, the bitmask 134 may be generated for use in comparison with the bit pattern of the searched keys. This comparison may indicate similarities between the bitmask 134 and the searched keys, and if similarities are found, then the collision chain 136 may be linearly probed to locate the searched keys and the corresponding value and/or to determine if the collision chain 136 includes the searched keys. However, by comparing the bitmask 134 and the bit pattern of the searched keys, if there are no similarities, then the process 200 may quickly determine that the searched keys is not located within the collision chain 136 and accordingly, the process 200 may avoid linearly probing the collision chain 136. In this sense, the bitmask 134 may reduce an amount of computing resources that are conventionally spent probing low hit rate hash tables 102, or those searches that frequently (above and/or below a certain threshold) return a miss.

In some instances, the process 200 may not actively determine whether the slot contains the collision chain 136 at 210. Instead, if the first bit pattern of the searched key(s) 118 is not the same as the second bit pattern of the first key of the collision chain 136, the process 200 may utilize the bitmask(s) 134. That is, the use of the bitmask(s) 134 may not be conditioned upon, or require, a determination that the slot contains the collision chain 136. Instead, for example, the storage of the bitmask(s) 134 in association with the first key may indicate the collision chain 136 at the slot, which in turn, may trigger the use of the bitmask(s) 134.

Figure 4:
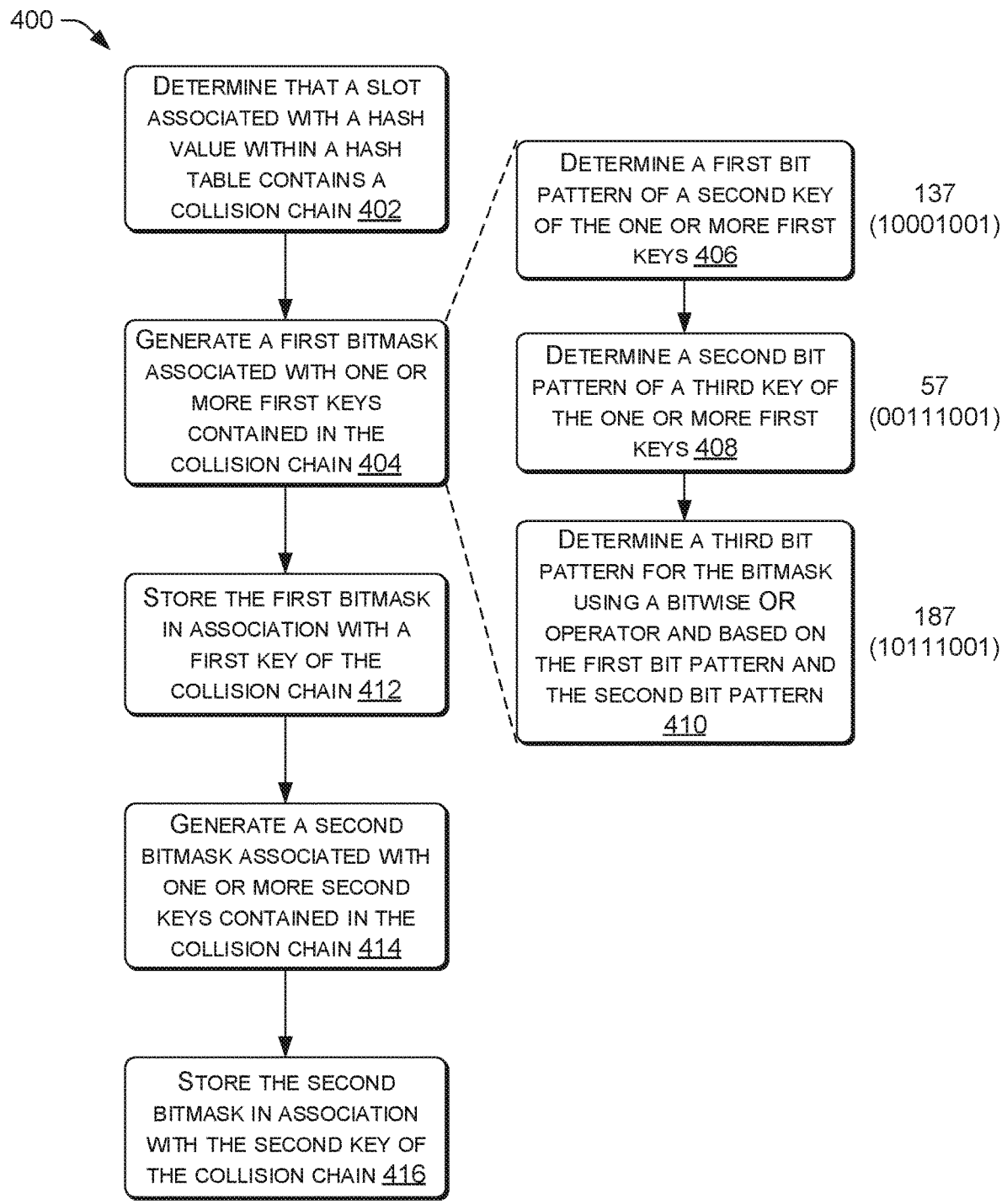
FIG. 4 illustrates an example process for generating one or more bitmask(s) and storing the bitmask(s) in association with a hash table, according to an embodiment of the present disclosure.

FIG. 4 illustrates an example process 400 for determining a bitmask 134 for a hash table 102, or for a slot within the hash table 102. In some instances, the bitmask 134 may be generated during a generation of the hash table 102, or during an update to the hash table 102.

At 402, the process 400 may determine that a slot associated with a hash value within a hash table contains a collision chain. For example, in instances where more than one key includes the same hash value 106, and correspondingly, maps to the same slot within the hash table 102, the process 200 may determine that the slot includes a collision chain 136. For example, a slot within the hash table 102 may include the keys 15, 137, and/or 57. Each of these keys 104 may be associated with a respective value 110 stored in the hash table 102. However, the keys 104 may be different than those shown, illustrated, and described with regard to the process 400

At 404, the process 400 may generate a first bitmask associated with one or more first keys contained within the collision chain. In some instances, the bitmask 134 may be generated from the bit patterns 132 of the one or more keys 104 within the collision chain 136. As shown, generating the bitmask 134 may include sub-operations 406-410.

At 406, the process 400 may determine a first bit pattern associated with a second key of the one or more first keys. For example, as shown, the first bit pattern of the second key (137) may be (10001001). In some instances, the bit pattern of the first key of the collision chain 136 (i.e., 15) may not be utilized when generating the bitmask 134, as the bitmask 134 is representative of the keys 104 contained within the collision chain 136 that are after the first key.

At 408, the process 400 may determine a second bit pattern associated with the third key of the one or more first keys. For example, as shown, the second bit pattern of the third key 57 may be (00111001). The third key (57) may represent a second key of the collision chain 136.

At 410, the process 400 may determine a third bit pattern for the bitmask using a bitwise OR operator, and based on the first bit pattern and the second bit pattern. The bitwise OR operator may combine the first bit pattern and the second bit pattern to generate the third bit pattern for the bitmask 134. For example, using the bitwise OR operator on (10001001) and (00111001) may generate the bitmask 134 having the third bit pattern of (10111001), which numerically represents 187.

After generating the bitmask 134, or the bit pattern associated therewith, the process 400 may proceed to 412.

At 412, the process 400 may store the bitmask 134 in association with a first key of the collision chain. For example, once the bitmask 134 is generated, the bitmask 134 may be stored in association with the first key of the collision chain 136 (i.e., the key 15). That is, as discussed above, upon identifying that a slot contains the collision chain 136, the bit pattern of the searched keys 104 may be compared against a bit pattern of the first key, and if a match is not found, the bit pattern of the searched keys may be compared against the bit pattern of the bitmask 134. This comparison may determine whether there are similarities between the bit pattern of the bitmask 134 and the searched keys, and such indication may be used when determining whether to search the collision chain 136. For example, if there are similarities, then the collision chain 136 may be linearly probed. However, if there are no similarities, then it may be determined that the collision chain 136 does not contain the searched keys 104, and a miss may be returned.

Having the bitmask 134 stored in association with the first key allows the bitmask 134 to be utilized in real time, and without waiting for the bitmask 134 to be generated during a search. Moreover, as the hash table 102 is updated, or new keys are stored in the same slot (i.e., contained/added to the collision chain 136), the bitmask 134 may be updated to indicate the keys 104 within the collision chain 136, or updated using the bit patterns of the newly removed and/or added keys 104.

At 414, the process 400 may generate a second bitmask associated with one or more second keys contained within the collision chain. For example, in some instances, rather than the collision chain 136 including one bitmask 134, the collision chain 136 may include two, three, four, or any number of bitmasks 134 that are stored in association with respective keys of the collision chain 136. However, the additional bitmask 134 may not utilize the bit patterns of the preceding keys, as those keys have been previously searched. For example, the second bitmask may be generated using a similar process as described above with regard to the first bitmask (sub-operations 406-410), but the second bitmask may be generated using different keys of the collision chain 136. For example, the second bitmask may be generated from bit patterns of the third key and/or a fourth key of the collision chain 136. In other words, deeper into the collision chain 136, the set or number of keys contributing to the second bitmask 134 decrease and therefore, the bitmasks 134 may become more accurate in predicting whether the hash table contains the searched key(s).

At 416, the process 400 may store the second bitmask in association with the second key of the collision chain. Upon searching the collision chain 136, in some instances, at a first instance, the bit pattern of the searched keys 104 may be compared against the bit pattern of the first key within the collision chain 136, at a second instance, the bit pattern of the searched keys 104 may be compared against the bit pattern of the first bitmask, and at a third instance, the bit pattern of the searched keys 104 may be compared against the bit pattern of the second bitmask. However, although the process 400 describes generating and/or using two bitmasks for searching the collision chain 136, it is to be understood that, in some instances, more than two bitmasks may be used for searching the collision chain 136. Here, each key within the collision chain 136, except for the last key, may be associated with a bitmask that represents subsequent keys in the collision chain 136. The bitmask 134 stored in association with the keys 104 may be used for iteratively determining whether the collision chain 136 contains the searched keys 104. As such, by searching deeper into the collision chain 136, the keys 104 that contribute to generate the bitmasks 134 decrease and therefore, the bitmasks 134 may become more accurate to predict whether the collision chain 136 includes the searched keys 104.

While the second key and the third key are shown including bit patterns 132 have a length of one byte (8 bits), the bit patterns 132 may be any length. For example, the bit patterns may be 8 byte (64 bits). Regardless, the processes discussed herein may compare bit patterns 132 of any length for determining whether the hash table 102 contains the searched keys 104. Moreover, the bitmask 134 may take any length of bytes for comparison to the bit patterns 132 of the keys 104 within the hash table 102. As such, because different search queries contain different requests, wording, keys, etc., different length bit patterns may be used to specify the search.

Moreover, although the process 400 describes generating bitmasks 134 for a given collision chain 136 or slot within the hash table 102, it is to be understood that bitmasks 134 may be generated for other collision chains 136 and/or slots within the hash table 102.

Figure 5:
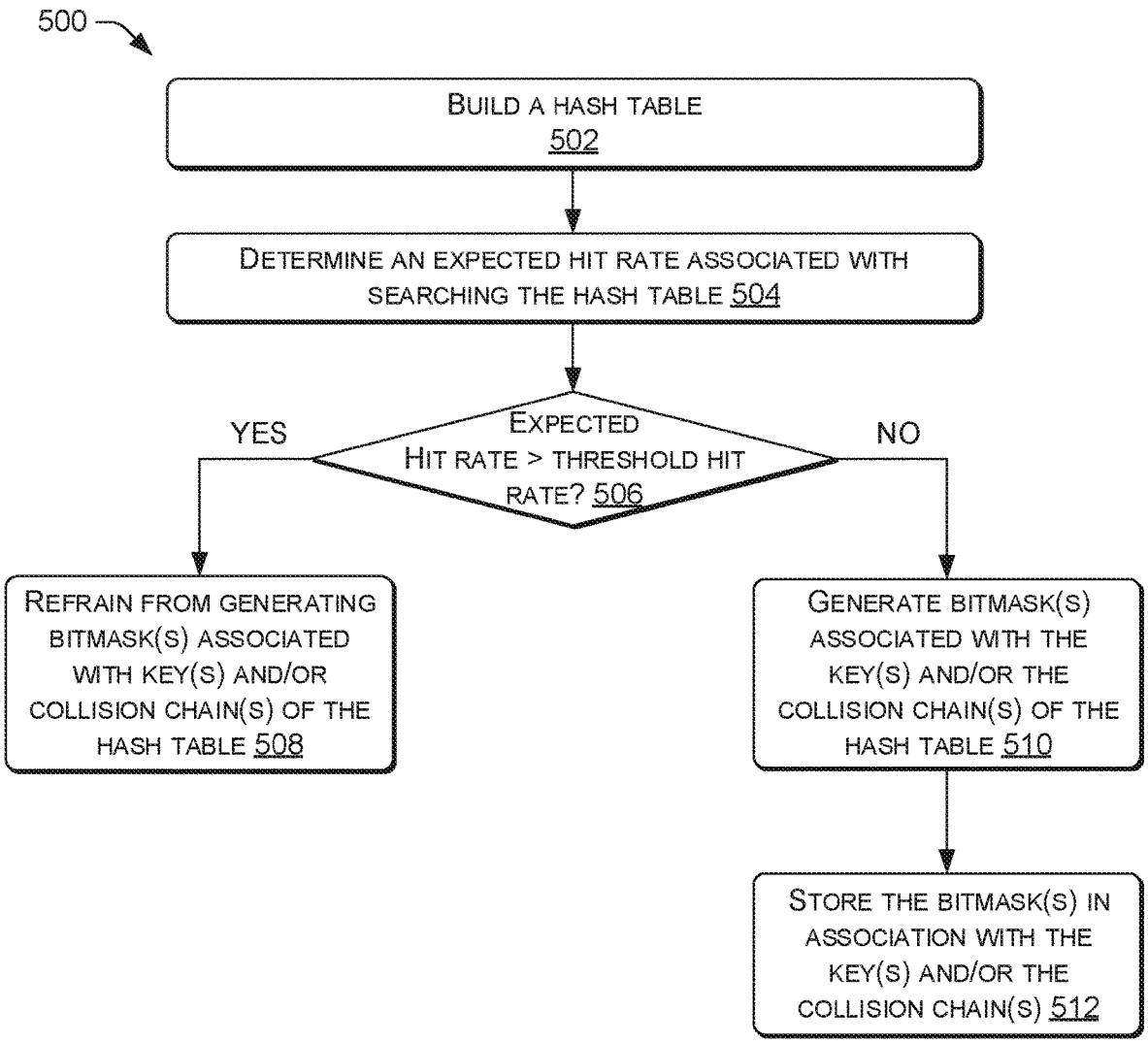
FIG. 5 illustrates an example process for utilizing bitmask(s) when generating a hash table, according to an embodiment of the present disclosure.

FIG. 5 illustrates an example process 500 for determining whether to generate bitmask(s) for a hash table. For example, in certain instances, hash tables 102 may have low hit rates (e.g., where misses are predominantly returned when performing searches) or high hit rates (e.g., where hits are predominantly returned when performing searches). In some instances, searching the collision chains 136 using a bitwise AND operator may be more time consuming and/or computing intensive than linearly probing the collision chains 136 for comparing the bit pattern 132 of the searched key(s) 118 to that of the bit patterns 132 in the collision chains 136. As such, some of the hash tables 102 may be generated with the bitmask(s) 134 while some of the hash tables 102 may be generated without bitmask(s) 134. In turn, when searches to the hash tables 102 are performed, if the hash table 102 contains the bitmask(s) 134, then in some instances, the bitmask(s) 134 may be utilized.

At 502, the process 500 may build a hash table. For example, the process 500 may receive a request to build the hash table 102 for certain key value pairs, or for storing certain values in association with key(s).

At 504, the process 500 may determine an expected hit rate associated with searching the hash table. For example, based at least in part on the key value pairs stored in the hash table 102, the process 500 may determine an expected hit rate of searches to the hash table 102. In some instances, the expected hit rate may be determined from past historical data that indicates a number of misses and/or hits, across various hash tables 102. Additionally, or alternatively, the expected hit rate may be determined given the nature or content of the key value pairs. For example, in candidate advertising, low hit rates may be expected. As such, when generating or building a new hash table 102, historical data from like or similar hash tables 102, and/or the content of the hash table 102, may be used for determining or estimating an expected hit rate of searches.

At 506, the process 500 may compare the expected hit rate to a threshold hit rate. For example, the expected hit rate of the hash table 102 may be compared against a threshold, or predetermined level, to determine whether the expected hit rate is greater than the threshold hit rate (e.g., satisfies). In some instances, the expected hit rate may be compared against the threshold hit rate to determine whether the expected hit rate is less than the threshold hit rate. In some instances, the threshold hit rate may be thirty percent, fourth percent, fifty percent, seventy percent, etc. If at 506, the process 500 determines that the expected hit rate is greater than the threshold hit rate, the process 500 may follow the "YES" route and proceed to 508.

At 508, the process 500 may refrain from generating bitmask(s) associated with key(s) and/or collision chain(s) of the hash table. For example, in instances where the expected hit rate is determined to be greater than the threshold hit rate, the process 500 may refrain from generating the bitmask(s) 134 for the hash table 102. In such instances, the process 500 may refrain from generating the bitmask(s) 134 given the expected hit rate (e.g., high hit rates) and because searching the hash table 102 with the bitmask(s) 134 may be more computationally intensive. As such, at the outset, when generating the hash table 102, the hash table 102 may not be generated with the bitmask(s) 134 and the hash tables 102 without the bitmask(s) 134 may not utilize the bitmask(s) 134 during searches to the hash table 102.

Alternatively, if at 106 the process 500 determines that the expected hit rate is less than the threshold hit rate, the process 500 may follow the "NO" route and proceed to 510.

At 510, the process 500 may generate bitmask(s) associated with the key(s) and/or the collision chain(s) of the hash table. For example, using the process 400 as described above, the process 500 may generate the bitmask(s) 134 based at least in part on the key(s) 104 of the collision chain(s) 136 within the hash table 102.

At 512, the process 500 may store the bitmask(s) in association with the key(s) and/or the collision chain(s). For example, as a result of generating the bitmask(s) 134, the process 500 may store the generated bitmask(s) 134 in association with the key(s) 104 of the collision chain(s) 136. As such, by storing the bitmask(s) 134, when searches to the hash table 102 are performed, the bitmask(s) 134 may be utilized.

Although the process 500 illustrates and describes determining whether to generate bitmask(s) 134 for a hash table 102 being built, in some instances, a length of the collision chain(s) 136 (e.g., a number of keys 104 within the collision chain 136) within the hash table 102 may be used when determining whether to generate bitmask(s) for certain collision chain(s) 136 of the hash table 102. Furthermore, although the process 500 describes a method for determining whether to generate bitmask(s) 134 during a building of the hash table 102, existing hash tables 102 may be updated to include, or be stored in association with, the bitmask(s) 134. For example, the process 500 may determine a hit rate associated with the hash table 102. If the hit rate is greater than the threshold hit rate, the process may not utilize the bitmask(s) 134 and may linearly probe the collision chain 136. Alternatively, if the hit rate is less than the threshold hit rate, then the hash table 102 may be updated with bitmask(s) 134 and/or a search to the hash table 102 may be performed using the bitmask(s) 134. In such scenarios, the process 500 may selectively determine when to utilize the bitmask(s) 134. Moreover, in some instances, a hit rate of a specific slot or collision chain 136 within the hash table 102 may be utilized when determining whether to use the bitmask(s) 134 when performing searches.

Figure 6:
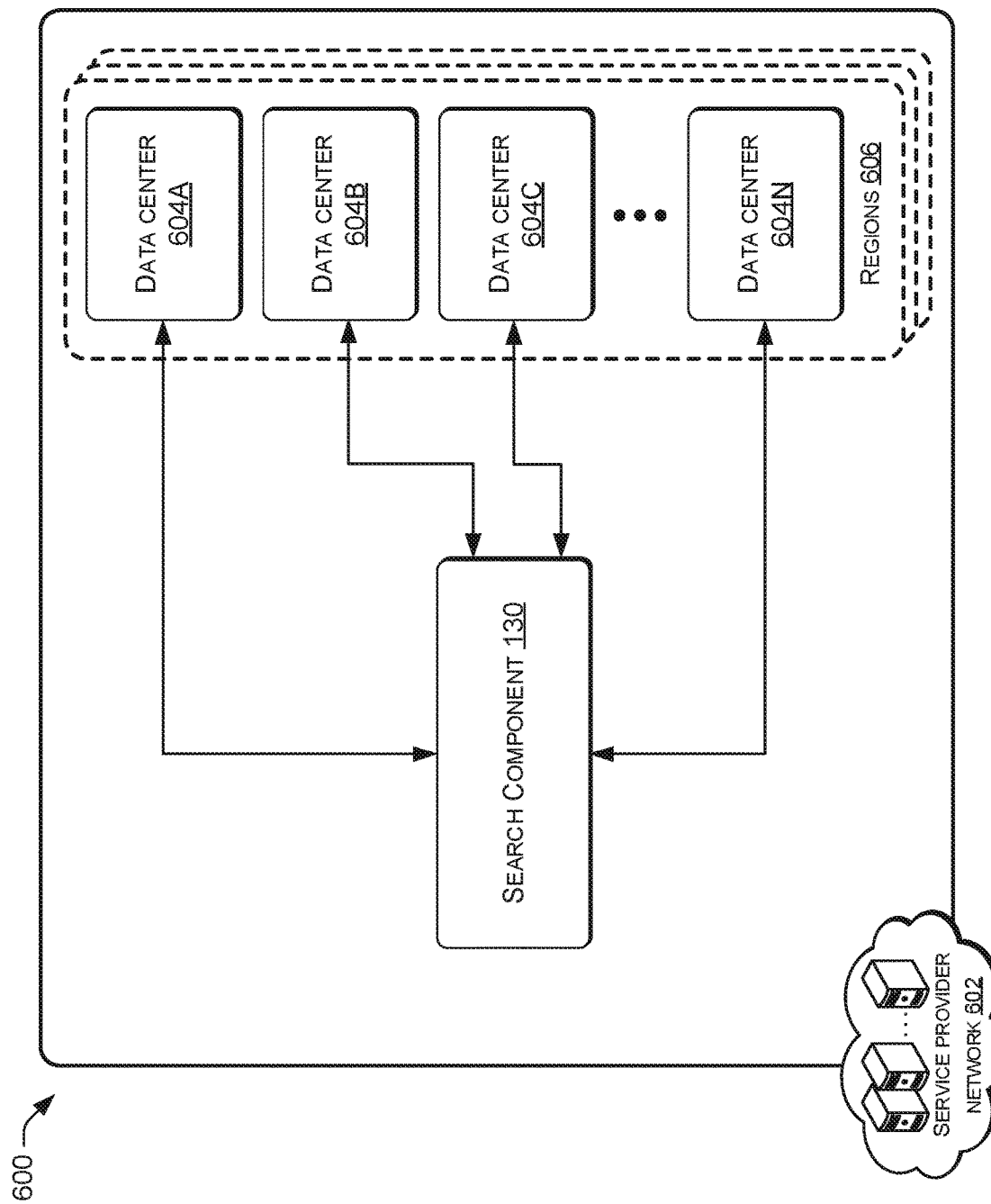
FIG. 6 illustrates an example system and network diagram that shows an operating environment including a service provider network that may be configured to implement aspects of the functionality described herein, according to an embodiment of the present disclosure.

FIG. 6 is a system and network diagram that shows an illustrative operating environment 600 that includes a service provider network 602. The service provider network 602 may be configured to implement aspects of the functionality described herein, such as searching hash tables 102 and determining whether the hash tables 102 contain keys, using the bit patterns 132 and/or the bitmasks 134, as discussed above. The service provider network 602 may provide computing resources, like virtual machine (VM) instances and storage, on a permanent or an as-needed basis. The computing resources provided by the network service provider 602 may include data processing resources, data storage resources, networking resources, data communication resources, network services, and the like. Among other types of functionality, the computing resources provided by the service provider network 602 may be utilized to implement the various services and components described above.

Each type of computing resource provided by the service provider network 602 may be general-purpose or may be available in a number of specific configurations. For example, data processing resources may be available as physical computers or VM instances in a number of different configurations. The VM instances may be configured to execute applications, including web servers, application servers, media servers, database servers, gaming applications, and/or other types of programs. Data storage resources may include file storage devices, block storage devices, and the like. The service provider network 602 may also be configured to provide other types of computing resources not mentioned specifically herein.

The computing resources provided by the service provider network 602 may be enabled in one embodiment by one or more data centers 604A-604N (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 may also be located in geographically disparate locations, or regions 606. One illustrative embodiment for a data center 604 that may be utilized to implement the technologies disclosed herein will be described below with regard to FIG. 7.

The service provider network 602 may be made available to consumers (e.g., business, entities, individuals, etc.) for accessing the computing resources provided by the service provider network 602 over any wired and/or wireless network(s), which may be a wide area communication network ("WAN"), such as the Internet, an intranet or an Internet service provider ("ISP") network or a combination of such networks. It should be appreciated that a local-area network ("LAN"), the Internet, or any other networking topology known in the art that connects the data centers 604 to remote clients and other users may be utilized. It should be appreciated that combinations of such networks may also be utilized. In some instances, the hash table searching, or search component 130, may be offered as a service by the service provider network 602, which may manage the deployment of computing resources of the service provider network 602. Additionally, or alternatively, the service provider network 602 may generate the hash tables 102 and/or the bitmask(s) 134 that at are stored in association with the hash tables 102.

Figure 7:
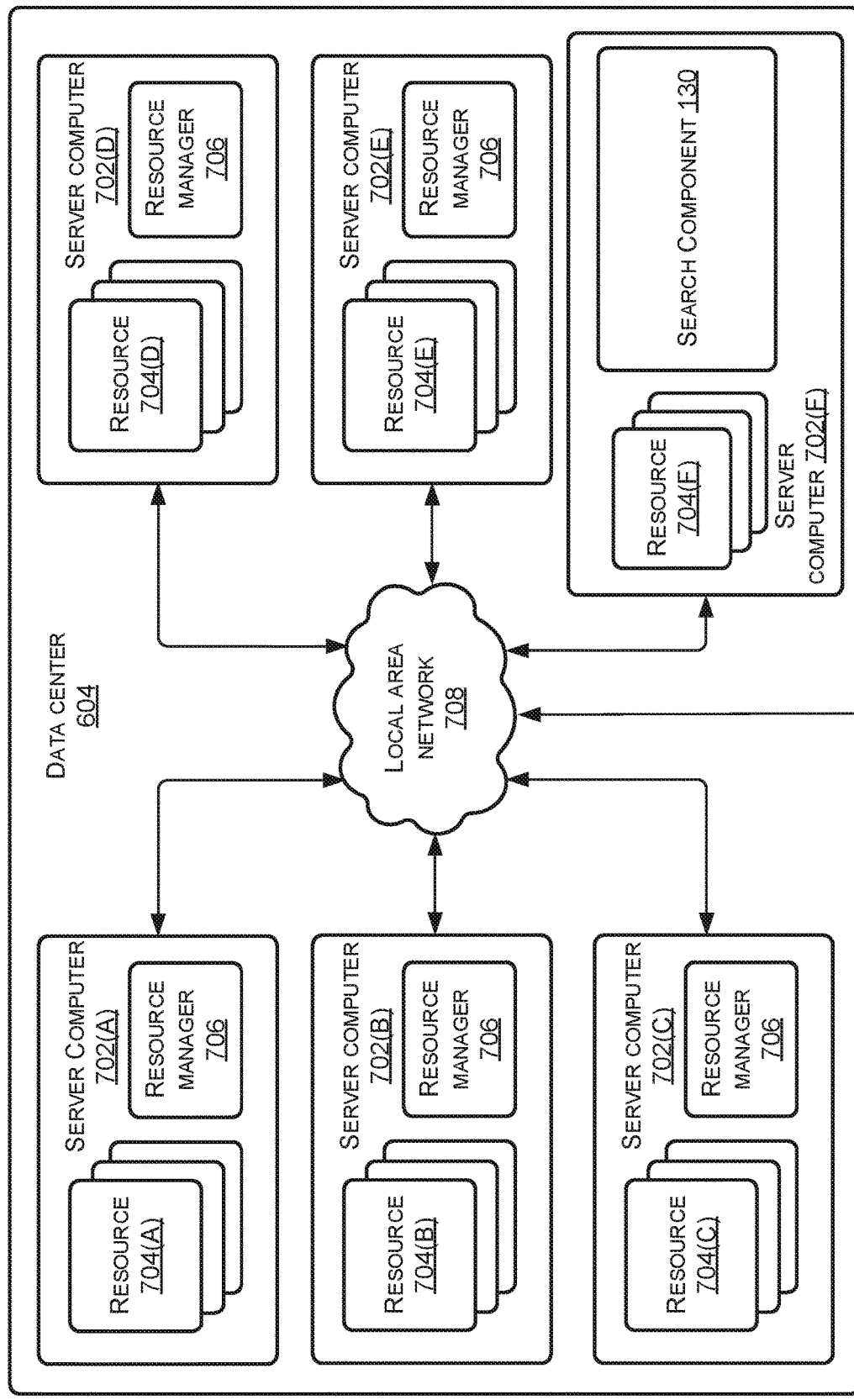
FIG. 7 illustrates an example computing system diagram showing a configuration for a data center that may be utilized to implement aspects of the technologies disclosed herein, according to an embodiment of the present disclosure.

FIG. 7 is a computing system diagram 700 that illustrates one configuration for the data center 604 that implements aspects of the technologies disclosed herein. The example data center 604 shown in FIG. 7 includes several server computers 702A-702F (which might be referred to herein singularly as "a server computer 702" or in the plural as "the server computers 702") for providing computing resources 704A-704E.

The server computers 702 may be standard tower, rack-mount, or blade server computers configured appropriately for providing the computing resources described herein (illustrated in FIG. 7 as the computing resources 704A-704E). The computing resources provided by the service provider network 602 may be data processing resources such as VM instances or hardware computing systems, database clusters, computing clusters, storage clusters, data storage resources, database resources, networking resources, and others. Some of the server computers 702 may also be configured to execute a resource manager 706 capable of instantiating and/or managing the computing resources. In the case of VM instances, for example, the resource manager 706 may be a hypervisor or another type of program configured to enable the execution of multiple VM instances on a single server computer 702. Server computers 702 in the data center 604 may also be configured to provide network services and other types of services.

In the example data center 604 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between each of the data centers 604A-604N, between each of the server computers 702A-702F in each data center 604, and, potentially, between computing resources in each of the server computers 702. It should be appreciated that the configuration of the data center 604 described with reference to FIG. 7 is merely illustrative and that other implementations may be utilized.

The data center 604 shown in FIG. 7 also includes a server computer 702F that may execute some or all of the software components described above. For example, and without limitation, the server computer 702F (and the other server computers 702) may generally correspond to a server/computing device configured to execute components including, without limitation, searching hash tables 102 (e.g., via the search component 130), as described herein, and/or the other software components described above. The server computer 702F may also be configured to execute other components and/or to store data for providing some or all of the functionality described herein. In this regard, it should be appreciated that the components illustrated in FIG. 7 as executing on the server computer 702F may execute on many other physical or virtual servers in the data centers 604 in various embodiments. Thus, the data center 604 in FIG. 7 may also include a plurality of server computers 702 that execute a fleet of VM instances.

Figure 8:
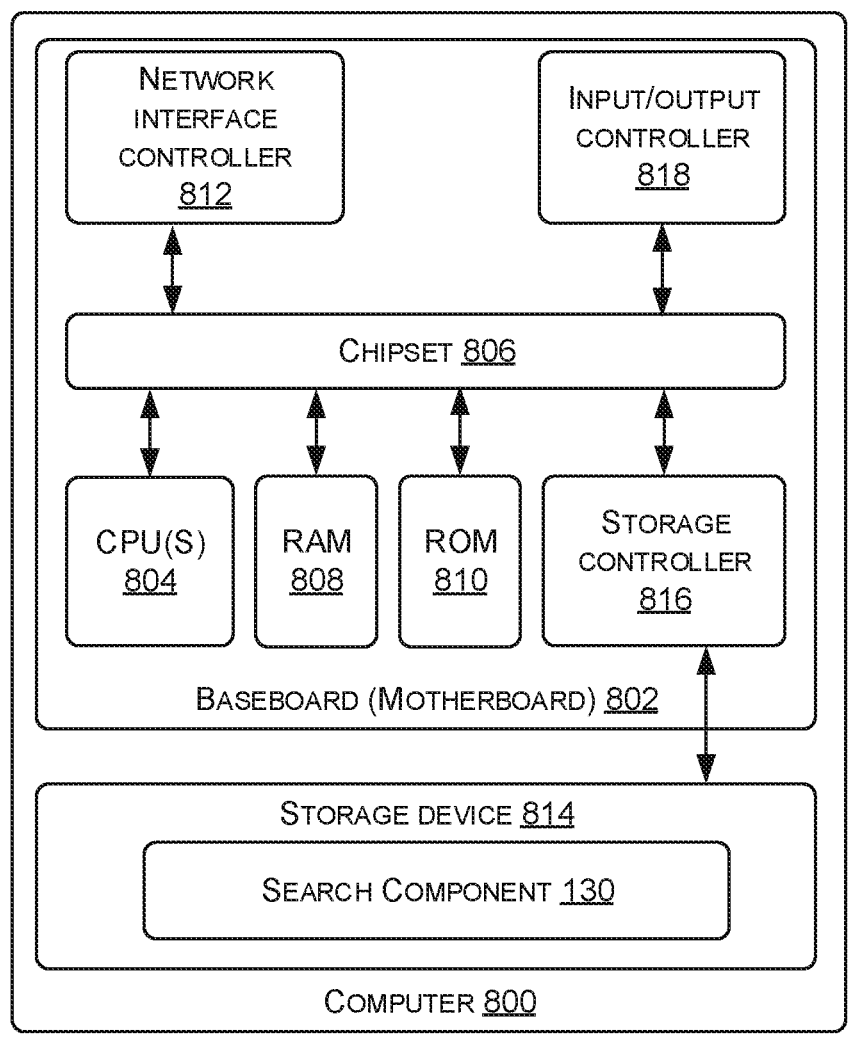
FIG. 8 illustrates an example computer architecture diagram showing an exemplary computer hardware architecture for implementing a computing device that may be utilized to implement aspects of the various technologies presented herein, according to an embodiment of the present disclosure.

FIG. 8 shows an example computer architecture for a computer 800 capable of executing program components for implementing the functionality described above. The computer architecture shown in FIG. 8 illustrates a server computer, workstation, desktop computer, laptop, tablet, network appliance, e-reader, smartphone, or other computing device, and may be utilized to execute any of the software components presented herein. In some examples, the computer 800 may correspond to one or more computing devices that implements the components and/or services described in FIG. 1 (e.g., the search component 130 and/or hash table searching).

The computer 800 includes a baseboard 802, or "motherboard," which is a printed circuit board to which a multitude of components or devices may be connected by way of a system bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a random-access memory (RAM) 808, used as the main memory in the computer 800. The chipset 806 may further provide an interface to a computer-readable storage medium such as a read-only memory ("ROM") 808 or non-volatile RAM ("NVRAM") for storing basic routines that help to startup the computer 800 and to transfer information between the various components and devices. The ROM 808 or NVRAM may also store other software components necessary for the operation of the computer 800 in accordance with the configurations described herein.

The computer 800 may operate in a networked environment using logical connections to remote computing devices and computer systems through a network, such as the LAN 908. The chipset 806 may include functionality for providing network connectivity through a network interface controller (NIC) 812, such as a gigabit Ethernet adapter. The NIC 812 is capable of connecting the computer 800 to other computing devices over the LAN 908 (or the network 808). It should be appreciated that multiple NICs 812 may be present in the computer 800, connecting the computer 80 to other types of networks and remote computer systems.

The computer 800 may be connected to a mass storage device 814 that provides non-volatile storage for the computer 800. The mass storage device 814 may store an operating system, programs, and/or components including, without limitation, the authentication service 88 that manages the authentication of users 82 before providing access to the network resource 84, as described herein, and data, which have been described in greater detail herein. The mass storage device 814 may be connected to the computer 800 through a storage controller 816 connected to the chipset 806. The mass storage device 814 may consist of one or more physical storage units. The storage controller 816 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 814 by transforming the physical state of the physical storage units to reflect the information being stored. The specific transformation of physical state may depend on various factors, in different embodiments of this description. Examples of such factors may include, but are not limited to, the technology used to implement the physical storage units, whether the mass storage device 814 is characterized as primary or secondary storage, and the like.

For example, the computer 800 may store information to the mass storage device 814 by issuing instructions through the storage controller 816 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 814 by detecting the physical states or characteristics of one or more particular locations within the physical storage units.

In addition to the mass storage device 814 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800. In some examples, the operations performed by the service provider network 602, and or any components and/or services included therein, may be carried out by the processor(s) 122.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("IHD-DVD"), BLU-RAY, or other optical storage, magnetic cassettes, magnetic tape, magnetic disk storage or other magnetic storage devices, or any other medium that may be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

As mentioned briefly above, the mass storage device 814 may store an operating system utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX operating system or one of its variants. It should be appreciated that other operating systems may also be utilized. The mass storage device 814 may store other system or application programs and data utilized by the computer 800.

In one embodiment, the mass storage device 814 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-5. The computer 800 may also include computer-readable storage media having instructions stored thereupon for performing any of the other computer-implemented operations described herein.

The computer 800 may also include one or more input/output controllers 818 for receiving and processing input from a number of input devices, such as a keyboard, a mouse, a touchpad, a touch screen, an electronic stylus, or other type of input device. Similarly, an input/output controller 818 may provide output to a display, such as a computer monitor, a flat-panel display, a digital projector, a printer, or other type of output device. It will be appreciated that the computer 800 might not include all of the components shown in FIG. 8, may include other components that are not explicitly shown in FIG. 8, or might utilize an architecture completely different than that shown in FIG. 8.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving a request associated with searching a hash table for a key value pair;
   identifying at least one key associated with the request that represents the key value pair;
   generating, using a hash function associated with the hash table, a hash value corresponding to the at least one key;
   determining a first bit pattern associated with the at least one key;
   locating a slot within the hash table corresponding to the hash value, wherein the slot contains a collision chain that includes at least a first key having a second bit pattern, a second key having a third bit pattern, and a third key having a fourth bit pattern;
   determining that the first bit pattern and the second bit pattern are different;
   identifying a bitmask that is stored in association with the second key, wherein the bitmask has a fifth bit pattern that is based on the third bit pattern and the fourth bit pattern;
   generating, using a bitwise AND operator, a sixth bit pattern based on the first bit pattern and the fifth bit pattern; and
   comparing the sixth bit pattern with the first bit pattern to determine whether the collision chain contains the at least one key.

2. The method of claim 1, further comprising generating the fifth bit pattern using a bitwise OR operator to compare individual bits of the third bit pattern with corresponding individual bits of the fourth bit pattern.

3. The method of claim 1, further comprising:
   determining that the sixth bit pattern is different than the first bit pattern; and
   determining, based on the sixth bit pattern being different than the first bit pattern, that the collision chain does not include the at least one key.

4. The method of claim 1, further comprising:
   determining that the sixth bit pattern is similar to the first bit pattern; and
   based on the sixth bit pattern being similar to the first bit pattern, linearly probing the collision chain using the first bit pattern.

5. The method of claim 1, further comprising:
   determining an expected hit rate associated with searching the hash table, wherein the expected hit rate represents an amount of times that searched keys are expected to be absent from the hash table;
   determining that the expected hit rate is less than a hit rate threshold; and
   generating the bitmask based on determining that the expected hit rate is less than the hit rate threshold.

6. A system comprising:
   one or more processors; and
   one or more non-transitory computer-readable media storing computer-executable instructions that, when executed by the one or more processors, cause the one or more processors to perform acts comprising:
     receiving a search query associated with searching a hash table for a first key, the first key including a first bit pattern;
     causing the first key to be hashed into a hash value;
     determining that a location within the hash table associated with the hash value, wherein the location contains a collision chain that includes a second key having a second bit pattern, a third key having a third bit pattern, and a fourth key having a fourth bit pattern, the first key representing an initial key within the collision chain;
     identifying a bitmask associated with the collision chain, wherein the bitmask is stored in association with the second key, and the bitmask has a fifth bit pattern that is based at least in part on a bitwise OR operator to combine the third bit pattern and the fourth bit pattern; and determining whether the collision chain contains the first key based at least in part on at least one of the second bit pattern or the bitmask.

7. The system of claim 6, wherein the acts further comprise:
comparing the first bit pattern with the second bit pattern;
determining that the first bit pattern and the second bit pattern are different; and
generating, using a bitwise AND operator and based at least in part on the first bit pattern and the second bit pattern being different, a sixth bit pattern based at least in part on the fifth bit pattern and the first bit pattern.

8. The system of claim 7, wherein the acts further comprise:
comparing the sixth bit pattern and the first bit pattern;
determining that the sixth bit pattern and the first bit pattern are a same; and
searching, based at least in part on the sixth bit pattern and the first bit pattern being the same, the collision chain to determine whether the collision chain contains the first key, wherein searching the collision chain comprises comparing the first bit pattern with at least one of the third bit pattern or the fourth bit pattern.

9. The system of claim 7, wherein the acts further comprise:
comparing the sixth bit pattern and the first bit pattern;
determining that the sixth bit pattern and the first bit pattern are different;
determining, based at least in part on the sixth bit pattern and the first bit pattern being different, that the first key is absent from the collision chain; and
generating an indication that a value associated with the first key is absent from the collision chain.

10. The system of claim 6, wherein the acts further comprise:
comparing the first bit pattern with the second bit pattern;
determining that the first bit pattern and the second bit pattern are a same; and
determining, based at least in part on the first bit pattern and the second bit pattern being the same, a value stored in the hash table that is associated with the second key.

11. The system of claim 6, wherein the bitmask comprises a first bitmask and the collision chain further includes a fifth key having a sixth bit pattern, the acts further comprise:
generating the first bitmask based at least in part on the bitwise OR operator to combine the third bit pattern and the fourth bit pattern;
generating a second bitmask based at least in part on the bitwise OR operator to combine the fourth bit pattern and the sixth bit pattern, the second bitmask having a seventh bit pattern; and
storing the seventh bit pattern in association with the third key.

12. The system of claim 6, wherein the acts further comprise:
determining an expected hit rate associated with search queries to the hash table; and
based at least in part on the expected hit rate, generating the bitmask.

13. A method comprising:
receiving a search query for at least one key within a hash table;
determining a hash value of the at least one key;
determining a location within the hash table corresponding to the hash value, the location including a collision chain;
determining a bitmask that is stored in association with the collision chain, wherein the collision chain includes a first key and one or more additional keys, and the bitmask is based at least in part on the one or more additional keys; and
determining whether the collision chain contains the at least one key based at least in part on at least one of:
comparing a first bit pattern of the at least one key with a second bit pattern of the first key; or
comparing the first bit pattern with the bitmask.

14. The method of claim 13, wherein the one or more additional keys include at least a second key and a third key, further comprising generating, using a bitwise OR operator, a third bit pattern associated with the bitmask, wherein the bitwise OR operator contains a fourth bit pattern of the second key and a fifth bit pattern of the third key.

15. The method of claim 13, further comprising:
based at least in part on comparing the first bit pattern with the second bit pattern, determining that the first bit pattern and the second bit pattern are different; and
based at least in part on determining that the first bit pattern and the second bit pattern are different, comparing the first bit pattern with the bitmask.

16. The method of claim 15, further comprising generating, using a bitwise AND operator, a third bit pattern based at least in part on a fourth bit pattern of the bitmask and the first bit pattern, and wherein comparing the first bit pattern with the bitmask comprises comparing the first bit pattern with the third bit pattern.

17. The method of claim 16, further comprising:
determining that the first bit pattern is a same as the third bit pattern; and
searching the collision chain, using the first bit pattern, to determine whether the collision chain includes the at least one key.

18. The method of claim 13, further comprising:
determining an expected hit rate associated with search queries to the hash table;
based at least in part on the expected hit rate, generating the bitmask; and
storing the bitmask in associated with collision chain.

19. The method of claim 13, wherein the bitmask comprises a first bitmask, the one or more additional keys comprise one or more additional first keys, further comprising determining a second bitmask based at least in part on one or more additional second keys and using a bitwise OR operator, wherein the one or more additional second keys include a lesser number of keys than the one or more additional first keys.

20. The method of claim 19, wherein:
the one or more additional first keys comprise at least a second key;
the first bitmask is stored in association with the first key of the collision chain, the first key representing a beginning key of the collision chain; and
the second bitmask is stored in association with the second key of the collision chain, the second key being subsequent to the first key.

* * * * *